(12) United States Patent
Johnson et al.

(10) Patent No.: US 12,290,166 B2
(45) Date of Patent: *May 6, 2025

(54) MOLDED PLASTIC STRUCTURES

(71) Applicant: Lifetime Products, Inc., Clearfield, UT (US)

(72) Inventors: Mitch Johnson, South Weber, UT (US); Kevin Boydston, Clinton, UT (US); Leo Cai, Xiamen (CN)

(73) Assignee: LIFETIME PRODUCTS, INC., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/608,724

(22) Filed: Mar. 18, 2024

(65) Prior Publication Data

US 2024/0215710 A1 Jul. 4, 2024

Related U.S. Application Data

(63) Continuation of application No. 17/822,388, filed on Aug. 25, 2022, now Pat. No. 11,930,919.
(Continued)

(51) Int. Cl.
*A47B 3/08* (2006.01)
*A47B 3/00* (2006.01)
(Continued)

(52) U.S. Cl.
CPC ............... *A47B 3/08* (2013.01); *A47B 3/002* (2013.01); *A47B 13/003* (2013.01); *A47B 13/083* (2013.01)

(58) Field of Classification Search
CPC ...... A47B 13/003; A47B 13/08; A47B 13/083
See application file for complete search history.

(56) References Cited

U.S. PATENT DOCUMENTS 4,280,805 A * 7/1981 Hafele ............... B29C 49/28
425/525
4,379,688 A * 4/1983 Tate .................. B29C 49/063
425/529
(Continued)

FOREIGN PATENT DOCUMENTS

CN 102293518 12/2011
CN 104939514 9/2015
(Continued)

OTHER PUBLICATIONS

International Search Report and Written Opinion mailed Dec. 7, 2022, in related PCT Application No. PCT/US2022/075504.
(Continued)

*Primary Examiner* — Daniel J Rohrhoff
(74) *Attorney, Agent, or Firm* — Maschoff Brennan

(57) ABSTRACT

A molded plastic structure, such as a panel, may include an upper surface, a lower surface, and a hollow interior portion. The panel may include an outwardly extending lip, blow point receiving portions, and a continuous tack-off. The lip may extend downwardly relative to the lower surface of the panel. The lip may include an outer surface and an inner surface. The blow point receiving portions may be configured to receive a blow pin. The blow point receiving portions may include a portion connected to the lower surface of the panel, another portion connected to the inner surface of the lip, and a hollow interior portion. The continuous tack-off may be disposed between the panel and the lip, and the continuous tack-off may extend between the blow point receiving portions. The continuous tack-off may prevent fluid flow between the panel and the lip along the section of the lip.

20 Claims, 8 Drawing Sheets

Related U.S. Application Data

(60) Provisional application No. 63/237,914, filed on Aug. 27, 2021.

(51) Int. Cl.
*A47B 13/00* (2006.01)
*A47B 13/08* (2006.01)

(56) References Cited

U.S. PATENT DOCUMENTS

| | | |
|---|---|---|
| 4,727,816 A | 3/1988 | Virtue |
| 6,912,961 B2 | 7/2005 | Winter et al. |
| 6,968,789 B2 | 11/2005 | Baik et al. |
| 7,051,662 B2 | 5/2006 | Shenghao et al. |
| 7,059,254 B2 | 6/2006 | Strong et al. |
| 7,096,799 B2 | 8/2006 | Strong et al. |
| 7,111,563 B2 | 9/2006 | Strong |
| 7,150,237 B2 | 12/2006 | Lin |
| 7,171,910 B2 | 2/2007 | Neunzert |
| 7,278,361 B2 | 10/2007 | Zhurong |
| 7,331,297 B2 | 2/2008 | Strong et al. |
| 7,469,646 B2 | 12/2008 | Baik et al. |
| 7,475,642 B2 | 1/2009 | Shenghao et al. |
| 7,475,643 B2 | 1/2009 | Haney et al. |
| 7,475,644 B2 | 1/2009 | Strong et al. |
| 7,640,870 B2 | 1/2010 | Strong et al. |
| 7,644,667 B2 | 1/2010 | Strong et al. |
| 7,713,603 B2 | 5/2010 | Farran et al. |
| D619,831 S | 7/2010 | Branch |
| 7,905,185 B2 | 3/2011 | Peery et al. |
| D640,487 S | 6/2011 | Bennett |
| 7,971,930 B2 | 7/2011 | Larsen et al. |
| 8,006,630 B2 | 8/2011 | Strong et al. |
| 8,033,228 B2 | 10/2011 | Haney et al. |
| 8,156,875 B2 | 4/2012 | Neunzert et al. |
| D658,912 S | 5/2012 | Winter et al. |
| D659,450 S | 5/2012 | Winter et al. |
| 8,166,894 B1 | 5/2012 | Branch et al. |
| 8,181,579 B2 | 5/2012 | Leng |
| D662,736 S | 7/2012 | Peery et al. |
| D662,738 S | 7/2012 | Winter et al. |
| D667,659 S | 9/2012 | Winter et al. |
| 8,261,676 B2 | 9/2012 | VanNimwegen |
| D668,483 S | 10/2012 | Bennett |
| 8,302,541 B2 | 11/2012 | Haney et al. |
| D671,773 S | 12/2012 | Johnson et al. |
| D671,775 S | 12/2012 | Clegg et al. |
| D671,776 S | 12/2012 | Clegg et al. |
| D672,175 S | 12/2012 | Peery et al. |
| 8,342,107 B2 | 1/2013 | Mower et al. |
| 8,347,795 B2 | 1/2013 | Peery et al. |
| 8,397,652 B2 | 3/2013 | Peery et al. |
| 8,397,653 B2 | 3/2013 | Ashby et al. |
| 8,408,146 B2 | 4/2013 | Peery et al. |
| D681,982 S | 5/2013 | Clegg et al. |
| D682,586 S | 5/2013 | Clegg et al. |
| D683,985 S | 6/2013 | Nye et al. |
| D688,496 S | 8/2013 | Bennett |
| 8,534,205 B1 | 9/2013 | Johnson et al. |
| 8,544,393 B2 | 10/2013 | Branch et al. |
| 8,555,789 B2 | 10/2013 | Jin et al. |
| 8,555,790 B2 | 10/2013 | Winter et al. |
| 8,555,791 B2 | 10/2013 | Jin et al. |
| 8,578,863 B2 | 11/2013 | Peery et al. |
| 8,578,865 B2 | 11/2013 | Haney et al. |
| D696,882 S | 1/2014 | Clegg et al. |
| 8,622,007 B2 | 1/2014 | Peery et al. |
| D700,465 S | 3/2014 | Johnson et al. |
| 8,677,912 B1 | 3/2014 | Tsai |
| 8,683,929 B2 | 4/2014 | Peery et al. |
| 8,720,990 B2 | 5/2014 | Boydston |
| 8,726,817 B2 | 5/2014 | Bennett et al. |
| 8,746,155 B2 | 6/2014 | Haney et al. |
| 8,757,069 B2 | 6/2014 | Peery et al. |
| D708,462 S | 7/2014 | Nye et al. |
| D715,081 S | 10/2014 | Bennett |
| 8,857,349 B2 | 10/2014 | Peery et al. |
| 8,904,943 B2 | 12/2014 | Jin et al. |
| 8,943,982 B2 | 2/2015 | Peery et al. |
| D727,074 S | 4/2015 | Johnson et al. |
| 8,997,663 B2 | 4/2015 | Peery et al. |
| D733,475 S | 7/2015 | Johnson |
| D734,081 S | 7/2015 | Johnson et al. |
| 9,101,209 B2 | 8/2015 | Bennett et al. |
| D739,672 S | 9/2015 | Johnson et al. |
| D739,673 S | 9/2015 | Johnson |
| 9,138,050 B2 | 9/2015 | Peery et al. |
| D742,671 S | 11/2015 | Johnson |
| 9,173,482 B2 | 11/2015 | Peery et al. |
| 9,192,229 B2 | 11/2015 | Peery et al. |
| 9,192,230 B2 | 11/2015 | Clegg et al. |
| D748,418 S | 2/2016 | Johnson et al. |
| 9,277,808 B2 | 3/2016 | Cai et al. |
| 9,307,831 B2 | 4/2016 | Peery et al. |
| D756,694 S | 5/2016 | Johnson |
| 9,351,563 B2 | 5/2016 | Bennett et al. |
| D759,411 S | 6/2016 | Johnson et al. |
| 9,486,076 B2 | 11/2016 | Peery et al. |
| 9,532,644 B2 | 1/2017 | Nye et al. |
| 9,549,612 B2 | 1/2017 | Peery et al. |
| 9,591,918 B2 | 3/2017 | Nye et al. |
| 9,642,459 B2 | 5/2017 | Peery et al. |
| 9,661,916 B2 | 5/2017 | Peery et al. |
| 9,730,514 B2 | 8/2017 | Peery |
| 9,763,513 B2 | 9/2017 | Cai et al. |
| 9,763,517 B2 | 9/2017 | Peery et al. |
| 9,848,699 B2 | 12/2017 | Peery et al. |
| 10,092,091 B1 | 10/2018 | Wang |
| D863,853 S | 10/2019 | Johnson et al. |
| D864,637 S | 10/2019 | Johnson et al. |
| 10,932,560 B2 | 3/2021 | Leng |
| 11,324,311 B2 | 5/2022 | Johnson et al. |
| 11,730,262 B2 | 8/2023 | Johnson |
| 11,766,116 B2* | 9/2023 | Johnson .............. B29C 49/4802 108/115 |
| 11,766,117 B2 | 9/2023 | Johnson et al. |
| 11,930,919 B2* | 3/2024 | Johnson ................ A47B 3/002 |
| 2003/0217676 A1 | 11/2003 | Strong |
| 2003/0233968 A1 | 12/2003 | Strong |
| 2005/0103239 A1* | 5/2005 | Neunzert ................ F16B 12/24 108/132 |
| 2005/0160950 A1 | 7/2005 | Haney et al. |
| 2005/0274306 A1 | 12/2005 | Strong |
| 2006/0230989 A1 | 10/2006 | Haney |
| 2007/0199483 A1 | 8/2007 | Peery |
| 2011/0253015 A1 | 10/2011 | Trimble |
| 2012/0024201 A1* | 2/2012 | Haney .................. A47B 3/0912 108/50.11 |
| 2012/0266787 A1 | 10/2012 | Peery |
| 2013/0055930 A1* | 3/2013 | Peery .................... A47B 3/002 108/91 |
| 2013/0081560 A1 | 4/2013 | Peery et al. |
| 2013/0291481 A1 | 11/2013 | Haney et al. |
| 2014/0060399 A1* | 3/2014 | Peery .................... A47B 87/02 108/91 |
| 2014/0175710 A1* | 6/2014 | Groman ................ B29C 48/142 425/522 |
| 2016/0051049 A1 | 2/2016 | Peery et al. |
| 2017/0238698 A1 | 8/2017 | Nye |
| 2019/0150608 A1 | 5/2019 | Johnson et al. |
| 2020/0214440 A1* | 7/2020 | Johnson ................ A47B 13/003 |
| 2020/0337452 A1 | 10/2020 | Leng |
| 2021/0022502 A1* | 1/2021 | Jiang .................... B32B 27/327 |
| 2021/0330073 A1 | 10/2021 | Choi |
| 2022/0281204 A1 | 1/2022 | Jiang |
| 2022/0031072 A1* | 2/2022 | Lin ........................ B29C 49/02 |
| 2022/0288835 A1* | 9/2022 | Jiang ...................... B29C 49/20 |
| 2023/0062885 A1 | 3/2023 | Johnson et al. |
| 2023/0389694 A1 | 12/2023 | Johnson |

(56) References Cited

U.S. PATENT DOCUMENTS

2024/0008638 A1   1/2024   Johnson
2024/0008639 A1   1/2024   Johnson

FOREIGN PATENT DOCUMENTS

| EP | 3000353 A1 | 3/2016 |
| WO | 2017045579 | 3/2017 |
| WO | 2017147245 | 8/2017 |
| WO | 2019099784 A1 | 5/2019 |
| WO | 2021013264 A1 | 1/2021 |

OTHER PUBLICATIONS

International Preliminary Report on Patentability, in related PCT Application No. PCT/US2022/075504.
Science Direct, Closed Section Beam excerpts from various books of dates, https://wwww.sciencedirect.com/topics/engineering/closed-section-beam (year: 2022).
Engineering Library, Beam Torsion from "stress Analysis Manual" Air Force Flight Dyamics Laboratory, Oct. 1986 https://engineeinglibrary.org/reference/beam-torsion-ari-force-stress (year 1986).

* cited by examiner

MOLDED PLASTIC STRUCTURES

CROSS-REFERENCE TO RELATED APPLICATIONS

The present application is a continuation of U.S. patent application Ser. No. 17/822,388, entitled MOLDED PLASTIC STRUCTURES, filed Aug. 25, 2022, now U.S. Pat. No. 11,930,919, issued Mar. 19, 2024, which claims priority to and the benefit of U.S. Provisional Patent Application Ser. No. 63/237,914, which was filed on Aug. 27, 2021, each of which is incorporated by reference in its entirety.

BACKGROUND

Field of the Invention

The present invention generally relates to structures constructed from molded plastic and, more particularly, to furniture, such as tables, which may include molded plastic components.

Description of Related Art

Many different types of tables are known, and tables are used for a variety of purposes. For example, conventional tables may include legs that are pivotally attached to a tabletop, and the legs may be movable between a use position in which the legs extend outwardly from the tabletop and a storage position in which the legs are folded against the tabletop. Conventional tables with relatively large tabletops and folding legs are often referred to as "banquet tables" and these tables are frequently used in assembly halls, banquet halls, convention centers, hotels, schools, churches, and other locations where large groups of people meet. These tables can often be positioned in an assortment of configurations and used in a variety of settings. When the banquet tables are no longer needed, the table legs can be moved into the storage position and the tables may be more easily moved or stored.

Conventional tables often include tabletops constructed from materials such as wood, particleboard, or metal. Tabletops constructed from wood, particleboard, or metal, however, are often relatively heavy and this may make the table awkward or difficult to move. Tabletops constructed from wood or metal are also relatively expensive, and these types of tabletops must generally be treated or finished before use. For example, tabletops constructed from wood must generally be sanded and painted, and metal tabletops must be formed into the desired shape and painted. In addition, because these wooden and metal tabletops are relatively heavy, the cost to ship and transport the tables may be considerable. The weight of the tabletop may make the tables more difficult to move and store.

To decrease the weight of conventional tables, tabletops may be constructed from relatively lightweight materials such as plastic. Disadvantageously, tabletops constructed from lightweight materials may require large reinforcing members or other structural parts such as braces, brackets, support members, and the like to strengthen the tabletop. While these additional parts may increase the strength of the tabletop, the added parts may also increase the weight of the table. These additional parts may result in increased manufacturing costs and require additional time to assemble the table. In addition, extra fasteners may be required to assemble and connect these parts to the table, which may require extra time and labor during the manufacturing process. The additional parts and fasteners may further increase the cost of the table and make the table more difficult to manufacture. Moreover, these additional parts and fasteners may have sharp edges that can injure a user's legs or arms.

Conventional tables may include a frame that is connected to the tabletop. The frame may include a pair of siderails connected to sides of the tabletop using fasteners. Multiple fasteners may be required to securely connect the frame to the tabletop. When a relatively large load or force is applied to some known tables, the frame may bend, deform, and/or detach from the tabletop. In addition, the fasteners used to connect the frame to the tabletop may disconnect or separate from the tabletop. The fasteners may even damage and tear through the tabletop if the load or force exceeds a certain amount.

The tabletops of some known tables may be damaged if a relatively large load or force is applied. For example, a portion of the tabletop may bend or deform if a large load or force is applied to that portion of the tabletop. For instance, if a load or force is applied to an outer portion of the tabletop, that outer portion of the tabletop may undesirably bend or deform. In particular, the outer portion of the tabletop may be damaged, dented, or broken by the load or force applied to that portion of the tabletop.

BRIEF SUMMARY

A need therefore exists for a table that eliminates or diminishes the above-described disadvantages and problems.

One aspect is a structure that may be constructed from plastic. For example, the structure may be constructed from molded plastic. If desired, the structure may be constructed from blow-molded plastic.

Another aspect is a structure that may be constructed from molded plastic, such as blow-molded plastic, and the structure may be a tabletop. The tabletop may include one or more components and features, such as one or more lips, engagement structures, and/or continuous tack-offs. In an exemplary embodiment, the tabletop may include an upper surface, a lower surface, and a hollow interior portion disposed between the upper and lower surfaces. An exemplary lip may extend downwardly relative to the lower surface, and the lip may include outer and inner surfaces. Exemplary engagement structures may be sized and configured to contact, engage, receive, or otherwise be coupled to another structure for at least some period of time. For example, the engagement structures may be blow points, and the blow points may be sized and configured to receive a blow pin during the blow-molding process. The blow points may include a first portion connected to a lower surface of the tabletop, a second portion connected to an inner surface of the lip, and a hollow interior portion. The hollow interior portion of the blow point may be in fluid communication with a hollow interior portion of the tabletop. The continuous tack-off may be at least substantially disposed between the tabletop and the lip, and the continuous tack-off may extend or be disposed between engagement structures, such as between blow points. The continuous tack-off may at least substantially prevent direct fluid flow between the tabletop and the lip because the continuous tack-off may be disposed between the tabletop and the lip. The continuous tack-off may include one or more segments, and/or the tabletop may include one or more continuous tack-offs. For example, the continuous tack-off may be broken into one or more segments, and/or different segments of the structure may include a continuous tack-off.

Yet another aspect is a molded plastic structure that may be constructed using a blow-molding process. The blow-molded plastic structure may be a tabletop, and the tabletop may include one or more components or features, such as one or more lips, frames, engagement structures, continuous tack-offs, flow pathways, fastener receivers, structural features, and the like. One or more of these components or features may be integrally formed as part of a unitary, one-piece structure. For example, the tabletop, lip, engagement structures, continuous tack-offs, flow pathways, fastener receivers, and/or structural features may be integrally formed as part of a unitary, one-piece structure, and this unitary, one-piece structure may be formed during the blow-molding process. The tabletop may include an upper surface, a lower surface, and a hollow interior portion may be disposed between the upper surface and the lower surface of the tabletop. The lip may extend downwardly relative to the lower surface of the tabletop, and the lip may include an outer surface and an inner surface. The outer surface of the lip may form at least a portion of an outer edge or periphery of the tabletop, and the outer surface of the lip may be disposed substantially parallel to the inner surface of the lip. A distance between the outer surface of the lip and the inner surface of the lip may be substantially constant. In an exemplary embodiment, the distance between the outer and inner surfaces of the lip may be substantially constant between one or more of the engagement structures. For instance, if the engagement structures are blow points, the distance between the outer and inner surfaces of the lip may be substantially constant between a first blow point and a second blow point. In an exemplary embodiment, the inner surface of the lip may have substantially the same height, width, configuration, and/or construction between pairs of the blow points. In addition, the inner surface of the lip may include few or no inwardly and/or outwardly extending protrusions or projections between the blow points. Thus, in an exemplary embodiment, the inner surface of the lip may have a substantially planar configuration between the blow points or engagement surfaces, and/or the inner surface of the lip may have a substantially uninterrupted or even surface that is not disrupted by inwardly and/or outwardly extending protrusions or projections between the blow points or engagement structures. The lip may also have a generally constant or consistent size, shape, and/or confirmation between the engagement structures or blow points. For instance, the lip may have a generally or substantially uninterrupted or continual configuration between engagement structures or blow points. The engagement structures, such as the blow points, may be disposed in one or more pairs. For example, a pair of blow points may include a first blow point disposed at an end of a section of the lip and a second blow point may be disposed at another end of the section of the lip. A continuous tack-off may extend or be disposed between the first blow point and the second blow point. Thus, in an exemplary embodiment, the continuous tack-off may extend or be disposed between the first and second blow points. The tabletop may also include one or more sections, and the lip may include one or more sections. The continuous tack-off may have a length at least substantially equal to a length of a section of the tabletop or lip. The continuous tack-off may also have a length that is at least a majority of the length of the section or more, such as about fifty percent (50%), about sixty percent (60%), about seventy percent (70%), about eight percent (80%), about ninety percent (90%), about ninety-five percent (95%), or more. The continuous tack-off may at least substantially prevent fluid flow between the tabletop and the lip, and the continuous tack off may create at least a portion of a flow pathway. For example, a flow pathway may be disposed between the first blow point and the second blow point, and the flow pathway may be disposed within the lip and/or within the hollow interior portion of the tabletop. In an exemplary embodiment, a first flow pathway may be at least partially disposed in the lip, a second flow pathway may be at least partially disposed in the tabletop, and the continuous tack-off may at least substantially separate the first and second flow pathways. If the tabletop is constructed from blow-molded plastic, a gas may flow in the one or more flow pathways during the blow-molding process. The section of the lip containing the blow points and the continuous tack-off may extend along at least a portion of a side, corner, and/or end of the tabletop. An exemplary embodiment of a tabletop may include first and second blow points disposed along a first side of the tabletop, and third and fourth blow points disposed along a second side of the tabletop. The tabletop may further include one or more corners, which may be disposed between blow points, such as between the first blow point and the third blow point. A continuous tack-off may extend along a radius of the corners and the continuous tack-off may extend between the first blow point and the third blow point. In an exemplary embodiment, the blow points may be disposed in pairs such as a first pair of blow points nay be disposed proximate a first side and/or first end of the tabletop, and a second pair of blow points may be disposed proximate a second side and/or second end of the tabletop. In an exemplary embodiment, a continuous tack-off may extend or be disposed between the first and second blow points, the second and third blow points, the third and fourth blow points, and/or the first and fourth blow points. In another exemplary embodiment, a continuous tack-off may be disposed between the first and second blow points, a continuous tack-off may be disposed between the second and third blow points, a continuous tack-off may be disposed between the third and fourth blow points, and/or a continuous tack-off may be disposed between the first and fourth blow points. After reviewing this disclosure, one skilled in the art will appreciate that the tabletop may include any suitable number and arrangement of components and features, such as engagement structures, blow points, and/or continuous tack-offs. A combined length of the continuous tack-offs may be a length that is greater than about ninety-five percent (95%) of a length of the sides and the ends of the tabletop, and/or the perimeter of the tabletop. Other structures, such as structural features and/or fastener receivers, may be disposed on the inner surface of the lip, and these structures may be disposed between the blow points. The structural feature and/or fastener receives may be connected to the lower surface of the tabletop and the inner surface of the lip. The structural features and/or fasteners receives may be size and configured to add strength and/or rigidity to the lip. The structural feature and/or fastener receives may include a hollow interior portion, and the hollow interior portion may be in fluid communication with a hollow interior portion of the lip.

A further aspect is a blow-molded plastic structure constructed using a blow-molding process. The blow-molded plastic structure may be a tabletop with an upper surface, a lower surface, and a hollow interior portion disposed between the upper surface and the lower surface of the tabletop. The upper surface, the lower surface, and the hollow interior portion may be integrally formed as part of a unitary, one-piece structure. A lip may extend downwardly relative to the lower surface of the tabletop, and the lip may include an outer surface and an inner surface. A first blow point may be disposed in the inner surface of the lip, and the first blow point may be sized and configured to receive a blow pin during a blow-molding process. A second blow point may be disposed in the inner surface of the lip, and the second blow point may be sized and configured to receive a blow pin during the blow-molding process. A continuous tack-off may extend between the first blow point and the second blow point, and the continuous tack-off may be at least partially disposed between the tabletop and the lip.

The blow-molded plastic structure may include a first flow pathway providing fluid communication between the first blow point and a hollow interior portion of the lip during the blow-molding process; and a second flow pathway providing fluid communication between the first blow point, the hollow interior portion of the tabletop, and the second blow point during the blow-molding process, the second flow pathway may be at least substantially separated from the first flow pathway by the continuous tack-off. The continuous tack-off may include a first portion disposed at least proximate the first blow point and a second portion disposed at least proximate the second blow point. A frame may be connected to the tabletop, and the frame may contact the first blow point and the second blow point. A first fastener receiver may be disposed in the inner surface of the lip and a second fastener receiver may be disposed in the inner surface of the lip, the first fastener receiver and the second fastener receiver may be disposed between the first blow point and the second blow point, and an inner surface of the first fastener receiver and an inner surface of the second fastener receiver may be generally aligned with and generally disposed in a planar configuration with an inner surface of the first blow point and an inner surface of the second blow point. The continuous tack-off may be disposed between the lip and the tabletop on at least one side of the tabletop, at least one corner of the tabletop, and at least one end of the tabletop. A length of the continuous tack-off may be at least ninety-five percent (95%) of a length of a side of the tabletop. The first blow point may be disposed at least proximate a first corner of the tabletop and the second blow point may be disposed at least proximate a second corner of the tabletop, a first fastener receiver may be disposed between the first blow point and the second blow point, a second fastener receiver may be disposed between the first blow point and the second blow point, and the inner surface of the lip may have a generally planar configuration between the first blow point and the second blow point except where the first fastener receiver and the second fastener receiver are disposed. A portion of the lower surface of the tabletop may be integrally formed with a portion of the upper surface of the tabletop to form at least a portion the continuous tack-off. The continuous tack-off may be formed by mating two or more of the following surfaces: a portion of the outer surface of the lip, a portion of the inner surface of the lip, a portion of the lower surface of the tabletop, and/or a portion of the upper surface of the tabletop. The first blow point and the second blow point may be part of a plurality of pairs of blow points, the plurality of pairs of blow points may comprise at least two pairs of blow points, a first pair of blow points may include the first blow point and the second blow point disposed on a first side of the tabletop; a second pair of blow points may include a third blow point and a fourth blow point disposed on a second side of the tabletop, the continuous tack-off may include a first portion disposed between the first blow point and the second blow point, and the continuous tack-off may include a second portion disposed between the third blow point and the fourth blow point. The continuous tack-off may include a third portion disposed between the first blow point and the third blow point, the continuous tack-off may include a fourth portion disposed between the second blow point and the fourth blow point, and a combined length of the first portion, the second portion, the third portion, and the fourth portion of the continuous tack-off may be at least substantially equal to or greater than ninety-five percent (95%) of a perimeter of the tabletop. A distance between the inner surface of the lip and the outer surface of the lip may be substantially constant between the first blow point and the second blow point. A first end of the continuous tack-off may be disposed at least adjacent to the first blow point and a second end of the continuous tack-off may be disposed at least adjacent to the second blow point, and the lip and the continuous tack-off may have a generally uniform size, shape, configuration, and arrangement between the first blow point and the second blow point to create a structure with generally uniform characteristics.

Another further aspect is a table that may include a tabletop constructed from blow-molded plastic, the tabletop may include an upper surface, a lower surface, and a hollow interior portion; a lip may extend downwardly from the lower surface of the tabletop, the lip including an inner surface and an outer surface; a first blow point may be disposed in the inner surface of the lip, the first blow point may be sized and configured to receive a blow pin during the blow-molding process; a second blow point may be disposed in the inner surface of the lip, the second blow point may be sized and configured to receive a blow pin during the blow-molding process; a continuous tack-off may extend between the first blow point and the second blow point, the continuous tack-off may be disposed between the lip and the tabletop; a frame may be connected to the tabletop, the frame may include a first siderail and a second siderail; and one or more support structures may be connected to the tabletop, the support structures may be sized and configured to support the tabletop above a surface. The continuous tack-off may be disposed between the lip and the tabletop except where the blow points are located. The continuous tack-off may be disposed between the lip and the tabletop expect where one or more of the following features are located: the first blow point, the second blow point, a fastener receiver, or a structural feature; and the lip may have substantially the same size, shape, and configuration about the tabletop expect where one or more of the following features are located: the first blow point, the second blow point, the fastener receiver, or the structural feature. The inner surface and the outer surface of the lip may contact to form an at least substantially solid construction except where one or more of the following features are located: the first blow point, the second blow point, a fastener receiver, or a structural feature.

Still another further aspect is table that may include a tabletop constructed from blow-molded plastic, the tabletop may include an upper surface, a lower surface, and a hollow interior portion; a lip may extend downwardly from the lower surface of the tabletop, the lip including an inner surface and an outer surface; a plurality of blow points may extend inwardly from the inner surface of the lip, the blow points may be sized and configured to receive a blow pin during the blow-molding process; a plurality of fastener receivers may extend inwardly from the inner surface of the lip, the fastener receivers may be sized and configured to receive a fastener; a continuous tack-off may be disposed between the lip and the tabletop, the continuous tack-off may extend between blow points of the plurality of blow points; a frame may be connected to the tabletop, the frame may be connected to the fastener receivers by one or more fasteners; and one or more support structures may be connected to the tabletop, the support structures may be sized and configured to support the tabletop above a surface. The inner surface and the outer surface of the lip may at least partially touch to form a compression edge where the continuous tack-off is disposed between the lip and the tabletop.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of exemplary embodiments to further illustrate and clarify the above and other aspects, advantages, and features of the present invention. It will be appreciated that these drawings depict only exemplary embodiments of the invention and are not intended to limit its scope. Additionally, it will be appreciated that while the drawings may illustrate preferred sizes, scales, relationships and configurations of the invention, the drawings are not intended to limit the scope of the claimed invention. The invention will be described and explained with additional specificity and detail through the use of the accompanying drawings in which:

DETAILED DESCRIPTION OF EXEMPLARY EMBODIMENTS

Figure 1:
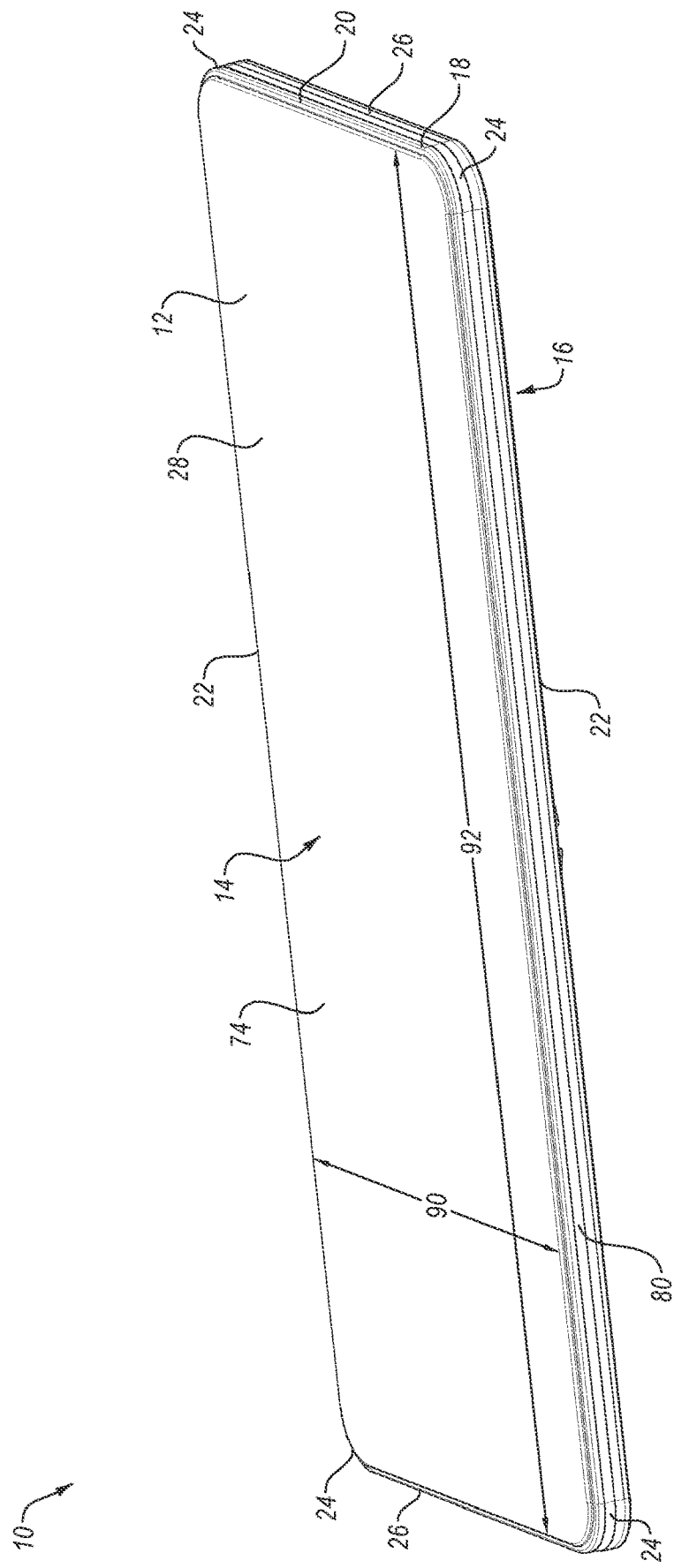
FIG. 1 is an upper perspective view of an exemplary embodiment of a table.

The following exemplary embodiments are generally described in connection with molded plastic tabletops. The principles of the present invention, however, are not limited to molded plastic tabletops. The principles of the present invention may be implemented with other structures, and the structures could be constructed from materials other than molded plastic. For example, the structures could be articles of furniture, panels, sporting equipment, and the like, or parts and/or components that are constructed from molded plastic. The structures, parts, components, and the like may also be constructed from non-plastic materials. In addition, it will be understood that, with the benefit of the present disclosure, these structures and components can have a variety of shapes, sizes, configurations, and arrangements. Moreover, while the tabletops shown in the accompanying figures may be configured for use in connection with banquet or utility tables, it will be appreciated that the tabletops may have any suitable size, shape, style, configuration, and/or arrangement. For instance, the tabletops may be implemented in round tables, personal tables, conference tables, seminar tables, folding tables, recreation tables, adjustable height tables, adjustable height folding tables, card tables, and the like. Further, the disclosed structures may be successfully used in connection with other types of furniture (e.g., chairs, stacking chairs, kids' chairs, benches, picnic tables, etc.), other types of structures (e.g., storage sheds, deck boxes, coolers, garden boxes, playground equipment, water sports equipment such as kayaks, canoes, paddleboards, etc.), and the like.

To assist in the description of the following exemplary embodiments, words such as top, bottom, front, rear, right and left may be used to describe the accompanying figures which may be, but are not necessarily, drawn to scale. It will further be appreciated that the tabletops can be disposed in a variety of desired positions or orientations, and used in numerous locations, environments, and arrangements. A detailed description of some exemplary embodiments now follows.

As shown in FIGS. 1-4, an exemplary table 10 may include a tabletop 12 and the tabletop 12 maybe constructed from molded plastic. The tabletop 12 may include an upper portion 14, such as an upper surface; a lower portion 16, such as a lower or underneath surface; and an outer boundary 18, such as the perimeter. As shown in the accompanying figures, a lip 20 may be disposed about the perimeter 18, and the lip 20 may extend downwardly from the lower portion 16 of the tabletop 12. The upper portion 14 may be spaced apart from the lower portion 16 of the tabletop 12 by a distance, which may be a generally constant distance in some embodiments. The tabletop 12 may include a hollow interior portion, and the hollow interior portion may be at least partially disposed between the upper portion 14 and the lower portion 16 of the tabletop 12.

The tabletop 12 may include one or more sides 22, corners 24, and ends 26. For example, the tabletop 12 may include two sides 22, such as a first side and a second side. The tabletop 12 may also include two ends 26, such as a first end and a second end. The tabletop 12 may include any suitable number of sides 22, corners 24, and ends 26 depending, for example, upon the size and shape of the tabletop 12.

All or a portion of the tabletop 12 may be part of a unitary, one-piece structure. For instance, the tabletop 12, which may include the upper portion 14, the lower portion 16, the hollow interior portion, the lip 20, the sides 22, the corners 24, and/or the ends 26, may be integrally formed as part of a unitary, one-piece structure during the molding process. If the tabletop 12 is constructed from plastic, it may be formed in the desired shape by blow-molding, injection molding, rotary molding, and/or other suitable processes. If the tabletop 12 is constructed from plastic, it may be constructed from high-density polyethylene (HDPE) or another suitable polymer. The tabletop 12 may also be constructed using other materials including non-plastic materials such as wood, metal, and the like.

The tabletop 12 may include a generally planar portion or element 28. The generally planar element 28 may form at least a portion of the tabletop 12, such as a portion of the upper surface or portion 14 and/or a portion of the lower surface or portion 16. For example, as shown in FIG. 1, the generally planar portion 28 may form at least a portion of the upper portion 14 of the tabletop 12, and the generally planar portion 28 may form a working surface of the tabletop 12. The generally planar portion 28 may form a center, inner, internal, or middle portion of the tabletop 12.

The lip 20 may be disposed about at least a portion of the perimeter 18 of the tabletop 12. For example, the lip 20 may extend about the entire perimeter 18 of the tabletop 12. In some embodiments, the lip 20 may extend along one or more portions of the tabletop 12, such as along all or a portion of one or more of the sides 22, the corners 24, and/or the ends 26. The lip 20 may also include one or more portions, sections, segments, and the like, which may be separated by a distance. All or a portion of the lip 20 may be spaced inwardly from the perimeter 18 of the tabletop 12. For example, one portion of the lip 20 may be generally aligned with the outer perimeter 18 of the tabletop 12, and another portion of the lip 20 may be spaced inwardly from the outer perimeter 18. The lip 20 may have different shapes, sizes, configurations, and/or arrangements depending, for example, upon the type of table 10. In an exemplary embodiment, the height of the lip 20 may be generally constant or the height may vary along the sides 22, the corners 24, and/or the ends 26 of the tabletop 12.

The lip 20 may extend in a generally downward direction from the lower portion 16 of the tabletop 12. For instance, at least a portion of the lip 20 may extend in a substantially normal direction from the lower portion 16 of the tabletop 12. In this exemplary configuration, when the tabletop 12 is oriented with the upper portion 14 facing up, the lip 20 may extend downwardly. The lip 20 may also extend generally downwardly relative to the upper portion 14, the lower portion 16, and/or the generally planar portion 28 of the tabletop 12.

The lip 20 may also be disposed at an angle relative to the upper portion 14, the lower portion 16, and/or the generally planar portion 28. For instance, at least a portion of the lip 20 may be disposed in a substantially normal direction relative to the upper portion 14, the lower portion 16, and/or the generally planar portion 28 of the tabletop 12. Additionally, one portion of the lip 20 may be disposed in the substantially normal direction relative to the upper portion 14, the lower portion 16, and/or the generally planar portion 28 of the tabletop 12, and another portion of the lip 20 may be disposed at an angle relative to the upper portion 14, the lower portion 16, and/or the generally planar portion 28 of the tabletop 12.

Figure 2:
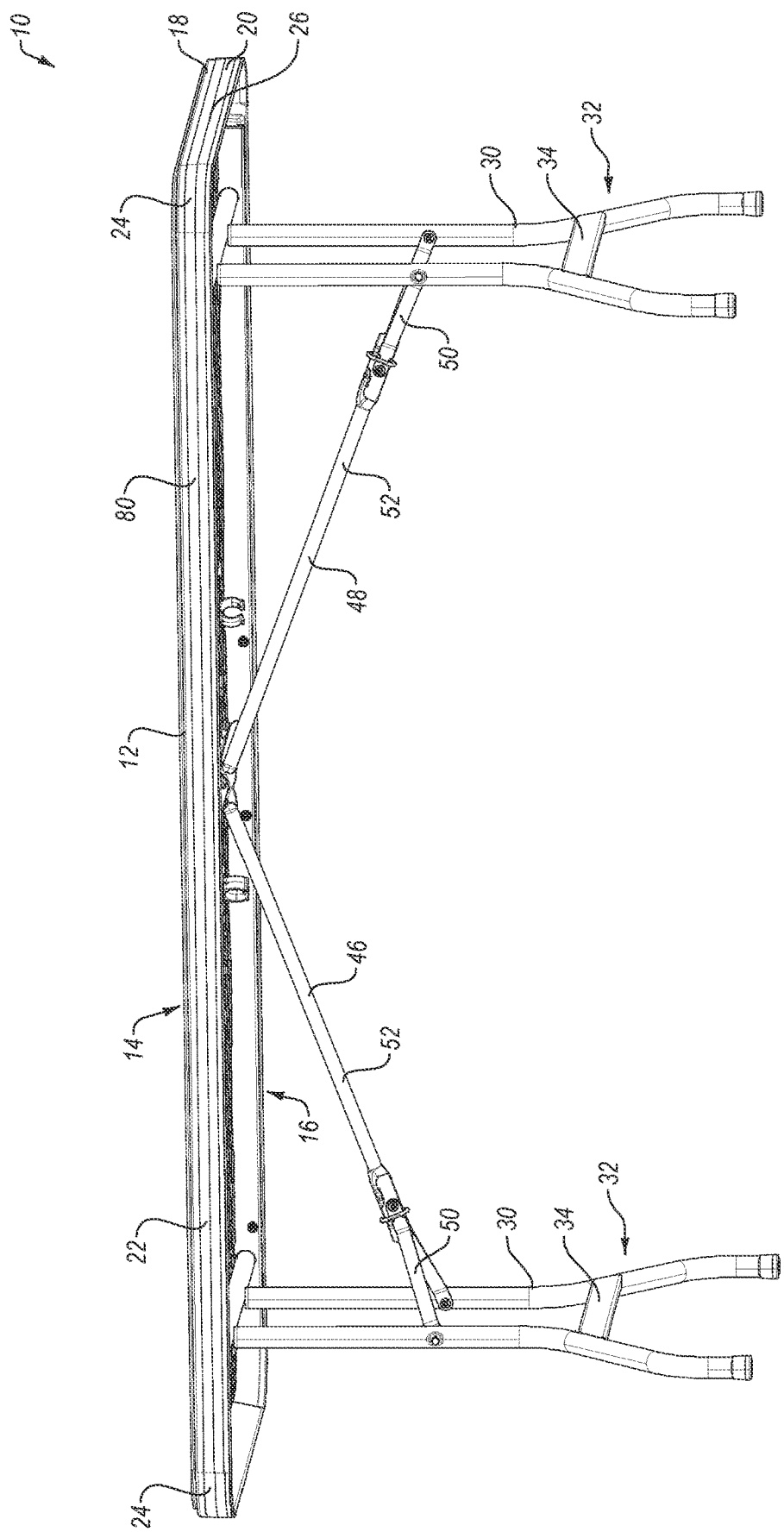
FIG. 2 is a lower perspective view of an exemplary embodiment of a table, illustrating exemplary support structures disposed in an extended configuration.
Figure 3:
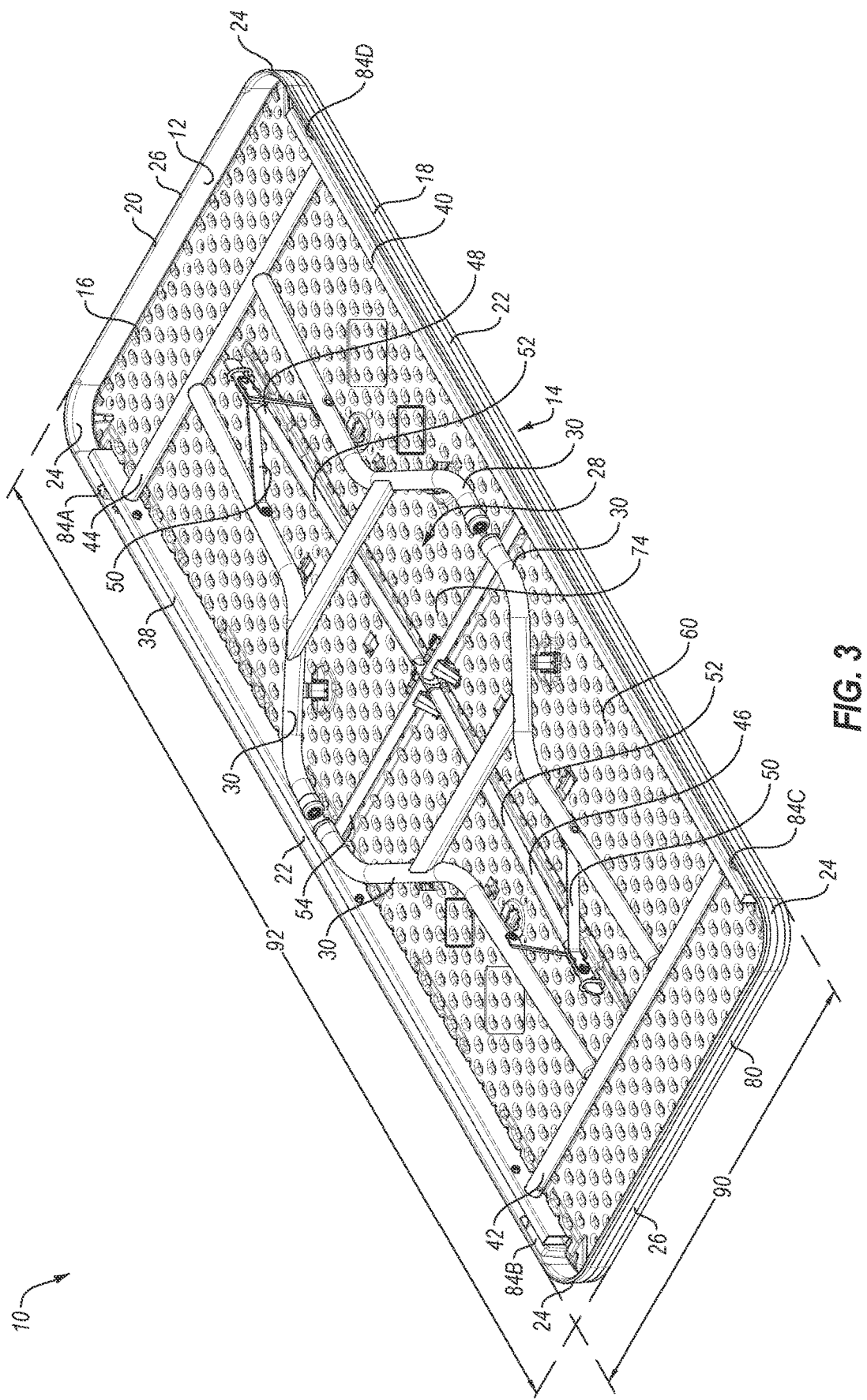
FIG. 3 is a lower perspective view of an exemplary embodiment of a table, illustrating exemplary support structures disposed in a collapsed configuration.

As shown in FIGS. 2 and 3, the table 10 may include one or more support structures 30, which may be sized and configured to support the tabletop 12 above a surface such as the floor or ground. The support structures 30 may include one or more legs or supports 32, and the support structures 30 may be movable between an extended or use position and a collapsed or storage position relative to the tabletop 12. As shown in the accompanying figures, the support structures 30 may include a pair of legs or supports 32 and a connecting member 34 may interconnect the supports. After reviewing this disclosure, one skilled in the art will appreciate that the support structures 30 may have a variety of different shapes, sizes, configurations, and/or arrangements depending, for example, upon the size and/or type of table 10. The support structures 30 may also be disposed in a fixed position, and the support structures 30 may be adjustable. For example, the support structures 30 may be height adjustable.

The table 10 may include a frame 36, and the frame 36 may be connected to the tabletop 12. For example, one or more fasteners may be used to attach the frame 36 to the tabletop 12. The frame 36, however, does not have to be attached to the tabletop 12 by fasteners. The frame 36 may include one or more elongated members, such as a first siderail 38 and a second siderail 40. The first siderail 38 may be disposed at least proximate a first side 22 of the tabletop 12, and the second side rail 40 may be disposed at least proximate a second side 22 of the tabletop 12. The first and second siderails 38, 40 may be sized and configured to support one or more portions of the tabletop 12, such as the lip 20, the sides 22, the corners 24, and/or the ends 26. After reviewing this disclosure, one skilled in the art will appreciate that the frame 36 may have a variety of different shapes, sizes, configurations, and/or arrangements depending, for example, upon the size and/or type of table 10.

The support structures 30 may be connected to the frame 36. The support structures 30 may also be pivotally or movably connected to the frame 36 to allow the legs 32 to move between the use and storage positions. For example, the support structures 30 may include or be connected to one or more cross members, such as cross members 42, 44. The cross members 42, 44 may be connected to or may be part of the frame 36. The cross member 42, 44 may be rotatably connected to the siderails 38, 40, which may allow the support structures 30. to be moved between the use and storage positions. One skilled in the art will appreciate that the support structures 30 and/or the legs 32 may be connected to any suitable portions of the table 10, and the table 10 may include any suitable number of support structures 30 and/or legs 32 depending, for example, upon the intended use of the table 10. One skilled in the art will also appreciate that the table 10, the tabletop 12, the support structures 30, the legs 32, the frame 36, and the cross members 42, 44 may have various shapes, sizes, configurations, and arrangements depending, for example, upon the intended use of the table 10. One skilled in the art will further appreciate that the frame 36, the siderails 38, 40, and/or the cross members 42, 44 may not be required, and the table 10 may have other components, features, aspects, characteristics, and the like, if desired.

The table 10 may include first and second brace assemblies 46, 48, and the brace assemblies 46, 48 may be connected to the support structures 30. For example, the brace assemblies 46, 48 may be connected to the legs 32, and the brace assemblies 46, 48 may be sized and configured to allow the support structures 30 to move between the use and storage positions. The brace assemblies 46, 48 may include a first portion 50, which may be connected to the support structures 30 and/or the legs 32, and a second portion 52, which may be connected to a portion of the tabletop 12 and/or the frame 36. For example, the second portion 52 of the brace assemblies 46, 48 may be connected to a cross member 54, and the cross member 54 may be connected to the frame 36. For instance, as shown in the accompanying figures, the second portion 52 of the brace assemblies 46, 48 may be connected to the cross member 54, and the cross member 54 may be connected to the siderails 38, 40 of the frame 36. It will be appreciated, after reviewing this disclosure, that the second portion 52 of the brace assemblies 46, 48 may be connected to other suitable portions of the table 10, such as a center support assembly.

In some embodiments, the frame 36 may be sized and configured to facilitate nesting of the tables 10. For example, the siderails 38, 40 of the frame 36 may be disposed along the sides 22 of the tabletop 12. Advantageously, if the siderails 38, 40 are disposed proximate the sides 22 of the tabletop 12, then the sides of the tabletop 12 may be supported by the frame 36, which may help create a strong and sturdy table 10. In addition, the siderails 38, 40 may be sized and configured to help transfer forces towards a center portion of the table 10 and/or away from the perimeter 18, which may also help create a strong and sturdy table 10.

Figure 4:
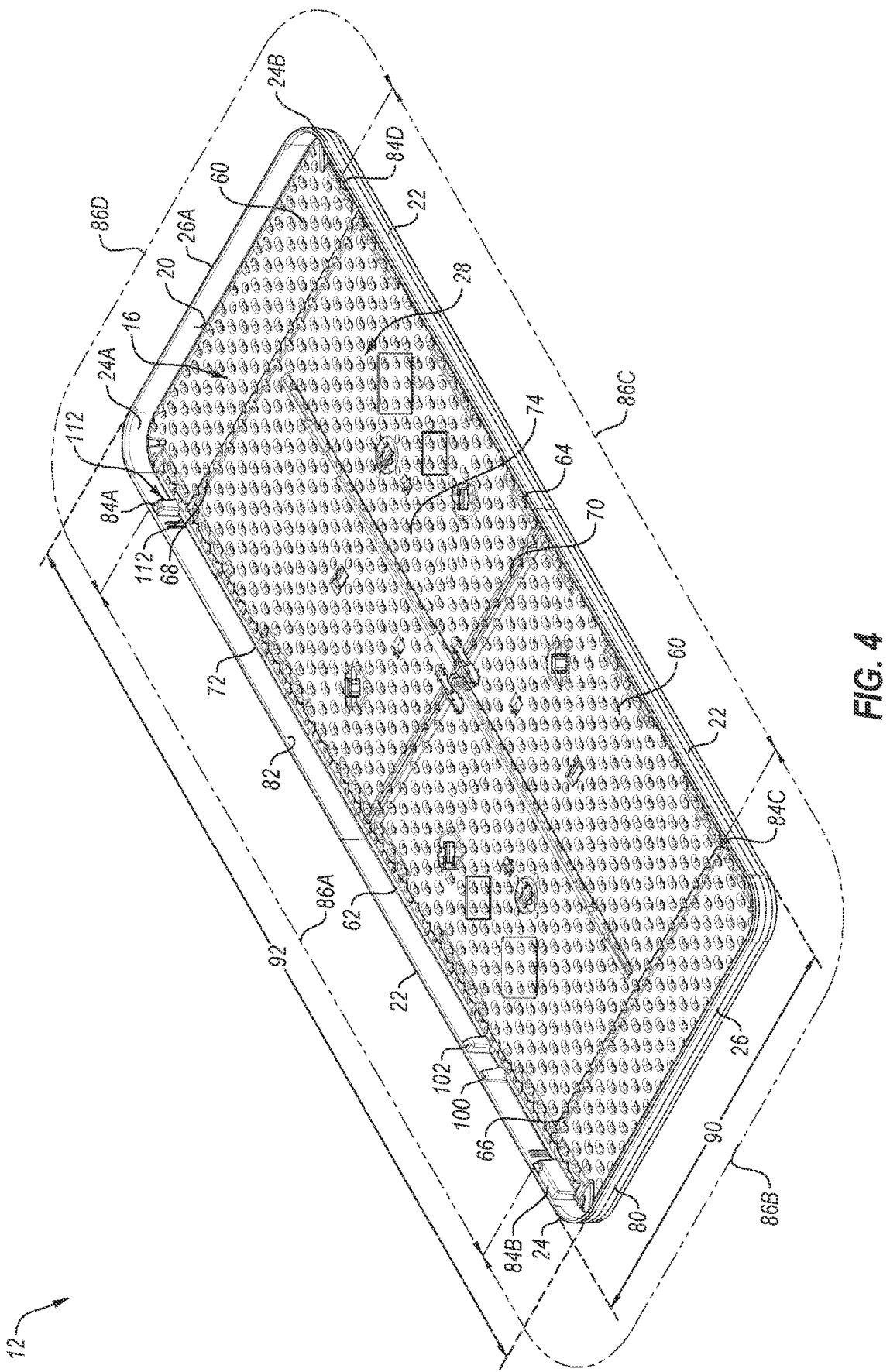
FIG. 4 is a lower perspective view of an exemplary tabletop.

As shown in FIGS. 3 and 4, the tabletop 12 may include one or more depressions 60, which may also be referred to as tack-offs. The depressions 60 may be sized, shaped, configured, and/or arranged to provide increased strength, stiffness, and/or rigidity to the tabletop 12. As shown in the accompanying figures, the depressions 60 may cover a majority, substantially all, or the entirety of the lower portion 16 of the tabletop 12. In addition, the depressions 60 may have a generally uniform shape, size, configuration, and arrangement. The depressions 60 may further have an elongated shape that is aligned with an axis, and the depressions 60 may be aligned in a series of rows and/or columns that extend along the length and/or width of the tabletop 12. Additionally, the depressions 60 in adjacent rows and columns may be offset, and the distance between adjacent depressions in the rows and columns may be generally constant or the same. The distance between adjacent rows and columns may also be generally constant or the same.

The depressions 60 may be used to create a tabletop 12 with generally uniform characteristics or qualities. For example, if the depressions 60 are consistently spaced, that may allow the upper portion 14 of the tabletop 12 to be uniformly supported. In addition, if the depressions 60 are separated by a generally constant distance, which may be measured from a center of one depression 60 to a center of an adjacent depression 60, that may create a tabletop 12 with more uniform characteristics or qualities. The distance between adjacent depressions 60 may be measured longitudinally, laterally, or at an angle depending, for example, upon the arrangement of the depressions 60.

The depressions 60 may be disposed in a pattern, and the depressions 60 may be generally aligned and/or disposed in predetermined locations within the pattern. The pattern may include, for example, any desired number of rows and/or columns of the depressions 60. The rows of the depressions 60 may be disposed along a length of the tabletop 12, and the columns of depressions 60 may extend along a width of the tabletop 12. The depressions 60 may also be disposed in other suitable forms and patterns, and the depressions 60 may have other shapes, sizes, configurations, and arrangements, depending, for example, upon the intended use of the tabletop 12.

The depressions 60 may have different characteristics depending, for example, upon the configuration of the depressions 60. For example, the depressions 60 may have an elongated length, which may increase strength along its length. The depressions 60 may also have a non-circular configuration with increased strength in one direction in comparison to another direction. Advantageously, if the depressions 60 have different characteristics, then the depressions can be arranged or configured so that the structure has certain characteristics. In particular, the depressions 60 may be arranged into a pattern to maximize certain characteristics and/or create a structure with generally uniform characteristics. For instance, the pattern may include uniformly spaced depressions 60 that are separated by a generally constant distance and/or disposed in a standardized arrangement. A consistent arrangement of the depressions 60 may help create a structure with uniform characteristics. For example, a generally constant pattern of depressions 60 may create a structure with generally uniform strength and structural integrity.

As shown in FIG. 4, one or more of the depressions 60 may be disposed in one or more recesses and/or receiving portions. For example, the tabletop 12 may include one or more frame receiving portions, such as a first frame receiving portion 62 and a second frame receiving portion 64. The first frame receiving portion 62 may be sized and configured to receive a portion of the frame 36, such as the first siderail 38, and the second frame receiving portion 64 may be sized and configured to receive a portion of the frame 36, such as the second siderail 40. The tabletop 12 may also include one or more cross member receiving portions, such as a first cross bar receiving portion 66, which may be sized and configured to receive the cross member 42, a second cross bar receiving portion 68, which may be sized and configured to receive the cross member 44, and a third cross bar receiving portion 70, which may be sized and configured to receive the cross member 54. The depressions 60 in the first frame receiving portion 62, the second frame receiving portion 64, the first cross member receiving portion 66, the second cross member receiving portion 68, and/or the third cross member receiving portion 70 may have generally the same size, shape, configuration, and/or arrangement as the depressions 60 in the pattern of remaining portions of the tabletop 12. The depressions 60 in the receiving portions 62, 64, 66, 68, and/or 70 may also have other sizes, shapes, configurations, and/or arrangements depending, for example, upon the size of the receiving portions. Advantageously, the depressions 60 in the receiving portions 62, 64, 66, 68, and/or 70 may help support the upper portion 14 of the tabletop 12. The depressions 60 in the receiving portions 62, 64, 66, 68, and/or 70 may also help support portions of the tabletop 12 disposed proximate the frame (e.g., the frame 36 shown in FIG. 3), which may help prevent the tabletop 12 from undesirably sagging or otherwise deforming. The depressions 60 may also help prevent portions of the tabletop 12 from undesirably bending or collapsing if a load or force is applied to that portion of the tabletop 12.

The tabletop 12 and the receiving portions 62, 64, 66, 68, and/or 70 may be sized to facilitate nesting of the tables 10. The receiving portions 62, 64, 66, 68, and/or 70 may also be sized and configured to enable portions of the frame 36 to be disposed in specific positions or locations of the tabletop 12. The frame 36 may be sized and configured to support portions of the tabletop 12, such as the sides 22, the corners 24, and/or the ends 26. The frame 36 may also be sized and configured to transfer forces towards a central portion of the tabletop 12, and the frame 36 may be sized and configured to transfer forces away from the perimeter 18 of the tabletop 12.

The support structures 30 and the frame 36 may be implemented with a variety of different tables 10 and tabletops 12, such as shown and described in U.S. Pat. No. 9,138,050, which is incorporated by reference in its entirety. One skilled in the art will appreciate, with the benefit of this disclosure, that the tabletop 12 may be configured and/or implemented with any suitable frame and/or support structures, and the frame and support structures may have assorted sizes, shapes, configurations, and arrangements. One skilled in the art will further appreciate that the frame and/or support structures are not required, and the tabletop 12 may be configured to interface with other structures, parts, components, and the like.

As shown in FIGS. 3 and 4, the lip 20 may form at least a portion of an outer boundary of the tabletop 12. In particular, the lip 20 may be disposed about the perimeter 18 of the tabletop 12. The lip 20 may be difficult to form during the molding process. For example, if the tabletop 12 is constructed from blow-molded plastic, a gas may be used during the blow-molding process to form the tabletop 12 and the lip 20. The lip 20 may be particularly difficult to form during the blow-molding process because the gas may have to flow to outermost portions of the structure. Additionally, the gas may have to travel significant distances and/or the gas may have to travel to the farthest portions of the mold or structure to form the lip 20. In addition, the gas must have sufficient pressure to form the lip 20. Thus, the lip 20 may be problematic to form during the blow-molding process because the gas may have to traverse significant distances, negotiate obstacles to reach remote portions of the mold or structure, and be at the correct pressure. If the gas pressure is too high, an opening or defect (referred to as a "blow-out") may occur. If the gas pressure is too low, the lip 20 may only partially or incompletely form. Therefore, if the gas flow and/or pressure are incorrect, then the lip 20 may not be properly formed during the blow-molding process and failure may result.

The tabletop 12 may include one or more continuous tack-offs 72, which may also be referred to as elongated or mono tack-offs, and the continuous tack-offs 72 may be disposed at least proximate the lip 20. In an exemplary embodiment, the continuous tack-offs 72 may be at least partially disposed between the tabletop 12 and the lip 20. The continuous tack-offs 72 may extend about at least a substantial portion (e.g., greater than about ninety percent (90%)), or an entirety of the perimeter 18 of the tabletop 12. The tabletop 12 may include a single continuous tack-off 72, and the continuous tack-off 72 may include one or more sections. For example, a first section of the continuous tack-off 72 may extend along a first portion of the tabletop and a second section of the continuous tack-off 72 may extend along a second portion of the tabletop. In an exemplary embodiment, a first section of the continuous tack-off 72 may be disposed along a first side 22 of the tabletop 12, and a second section of the continuous tack-off 72 may be disposed along a second side 22 of the tabletop 12. The first and/or second sections of the continuous tack-off 72 may also extend along at least a portion of the corners 24 and/or the ends 26 of the tabletop 12. The continuous tack-off 72 may also include a third section disposed along a first end 26 of the tabletop 12, and a fourth section disposed along a second end of the tabletop 12. After reviewing this disclosure, one skilled in the art will appreciate that the continuous tack-off 72 may include any suitable number of sections and/or the tabletop 12 may include more than one continuous tack-offs 72. For example, a first continuous tack-off 72 may be disposed along at least a portion of a first side 22, and the first continuous tack-off 72 may be disposed along one or more corners 24 and/or one or more ends 26. A second continuous tack-off 72 may be disposed along at least a portion of a second side 22, and the second continuous tack-off 72 may be disposed along one or more corners 24 and/or one or more ends 26. A third continuous tack-off 72 may be disposed along at least a portion of a first end 26, and the third continuous tack-off may be disposed along one or more corners 24 and/or one or more sides 22. A fourth continuous tack-off 72 may be disposed along at least a portion of a second end 26, and the fourth continuous tack-off 72 may be disposed along one or more corners 24 and/or one or more sides 22. After reviewing this disclosure, one skilled in the art will appreciate that the tabletop 12 may include any suitable number of continuous tack-offs 72, the continuous tack-offs 72 may include any number of sections, and the continuous tack-offs 72 may have various sizes, shapes, configurations, and/or arrangements.

The continuous tack-offs 72 may be similar to the depressions 60, but the continuous tack-offs 72 may have a significantly longer length. For example, the length of the continuous tack-offs 72 may be about ten, twenty, thirty, forty, fifty, or more times the length of the depressions 60 in the tabletop 12. Thus, if the average length of the depressions 60 is about one inch, then the length of the continuous tack-offs 72 may be about ten inches, about twenty inches, about thirty inches, about forty inches, about fifty inches, or more. The continuous tack-offs 72 may also have a length of about twelve inches, about twenty-four inches, about thirty-six inches, about forty-eight inches, about sixty inches, about sixty-four inches, or more. The length of the continuous tack-offs 72 may be generally equal to or slightly less than a distance between opposing ends 26 and/or sides 22 of the tabletop 12. Therefore, the continuous tack-offs 72 may have a length at least substantially equal to (e.g., greater than about ninety percent (90%)) or slightly less than the length and/or width of the tabletop 12. The length of the continuous tack-offs 72 may be the distance in which opposing surfaces touch, contact, join, mate, and/or engage. For example, the touching, contact, joining, mating, and/or engaging of the upper portion 14 and the lower portion 16 of the tabletop 12 may form at least a portion of the continuous tack-off 72 and may determine the length of the continuous tack-off 72. Additionally, the touching, contact, joining, mating, and/or engaging of a portion of the lip 20, such as the outer and/or inner surfaces 80, 82, and a portion of the tabletop 12, such as the upper and/or lower portions 14, 16, may form at least a portion of the continuous tack-off 72 and may determine the length of the continuous tack-off 72.

In an exemplary embodiment, a first continuous tack-off 72 may be disposed along a first side 22 of the tabletop 12, and the first continuous tack-off 72 may have a length at least substantially equal to a length of the tabletop 12. A second continuous tack-off 72 may be disposed along a second side 22 of the tabletop 12, and the second continuous tack-off 72 may have a length at least substantially equal to a length of the tabletop 12. The first and/or second continuous tack-offs 72 may have a length greater than a length of the tabletop 12 if, for example, the continuous tack-offs 72 are disposed along one or more of the corners 24 and/or the ends 26 of the tabletop 12. After reviewing this disclosure, one skilled in the art will appreciate that the continuous tack-offs 72 may be at least substantially (e.g., greater than about ninety percent (90%)) disposed about the perimeter 18 of the tabletop 12, and the continuous tack-offs 72 may be broken into one or more sections. One skilled in the art will also appreciate that any suitable number of continuous tack-offs 72 may be at least substantially (e.g., greater than about ninety percent (90%)) disposed between the lip 20 and the central portion or body 74 of the tabletop 12. For example, one, two, three, four, or more continuous tack-offs 72 may be at least substantially (e.g., greater than about ninety percent (90%)) disposed between the lip 20 and the central portion 74 of the tabletop 12. After reviewing this disclosure, one skilled in the art will appreciate that the tabletop 12 may include any suitable number, size, shape, configuration, and/or arrangements of continuous tack-offs 72 depending, for example, upon the size of the table 10. One skilled in the art will also appreciate, after reviewing this disclosure, that the continuous tack-offs 72 may be disposed about the perimeter 18 of the tabletop 12 and/or between the lip 20 and the central portion 74 of the tabletop 12.

In an exemplary embodiment, the continuous tack-offs 72 may be disposed along the ends 26 of the tabletop 12. For example, if the tabletop 12 has a width of about twelve or about twenty-four inches, the continuous tack-offs 72 may have a length substantially equal to or greater than twelve inches or twenty-four inches. In another exemplary embodiment, the continuous tack-off 72 may be disposed in one or more of the corners 24, and the continuous tack-off in the corners 24 may have a length of about three inches or more, about four inches or more, about five inches or more, about six inches or more, about seven inches or more, about eight inches or more, about nine inches or more, about ten inches or more, about eleven inches or more, or about twelve inches, or more.

The lip 20 may provide additional support to the sides 22, the corners 24, and/or the ends 26 of the tabletop 12. The lip 20 may provide increased strength, rigidity, structural integrity, and/or impact resistance. The lip 20 may also increase the life of the tabletop 12, and the lip 20 may reduce the likelihood that the tabletop 12 is damaged during use, shipping, and/or storage. For example, the lip 20 may help prevent the sides 22, the corners 24, and/or the ends 26 of the tabletop 12 from being damaged. The lip 20 may also help prevent the frame 36 from being damaged. For instance, the lip 20 may help prevent the siderails 38, 40 of the frame 36 from being damaged.

Advantageously, the lip 20 may help prevent damage to the tabletop 12, and the lip 20 may provide other benefits, such as improved aesthetics. For instance, the table 10 may be constructed and shipped to a retailer, wholesaler, customer, or end user. During the shipping process, the table 10 may be dropped or impacted with other products and surfaces. Such contact may impose considerable forces on the tabletop 12, especially the edges, corners, and outer portions of the tabletop 12. The lip 20 may have increased strength, rigidity, and/or structural integrity, and the lip 20 may be sized and configured to reduce or prevent damage to the tabletop 12 during shipping, transport, storage, and/or use. For example, the tabletop 12 may be part of a table 10 that may be configurable in storage and use arrangements. Between uses, the table 10 may be disposed in the storage arrangement and stored. The table 10 may be retrieved and configured in a use arrangement when it is desired to use the table 10. The table 10 may be dropped, tipped on its side, stuffed into a storage closet, etc., while it is being used, moved, or stored, which may result in damage to the tabletop 12.

The lip 20 and/or the continuous tack-off 72 may improve strength, rigidity, and/or structural integrity of one or more portions of the tabletop 12, such as the perimeter 18. For instance, the continuous tack-offs 72 may provide increased strength, rigidity, and/or structural integrity to the sides 22, the corners 24, and/or the ends 26. The continuous tack-offs 72 may also provide different properties and characteristics because, for example, of the elongated contact area between opposing surfaces of the molded plastic structure. For example, the continuous tack-offs 72 may be disposed at least proximate an intersection of the tabletop 12 and the lip 20. The continuous tack-offs 72 may include touching, joining, contact, and/or engagement of two or more surfaces, such as the outer surfaces of the molded plastic structure. The continuous tack-offs 72 may also include touching, joining, contact, and/or engagement of at least a portion an outer surface and an inner surface of the molded plastic structure. In an exemplary embodiment, the continuous tack-offs 72 may include touching, joining, contact, and/or engagement of the upper portion 14 of the tabletop 12, the lower portion 16 of the tabletop 12, the outer surface 80 of the lip 20, and/or the inner surface 82 of the lip 20. The touching, joining, contact, and/or engagement of the upper portion 14, the lower portion 16, the outer surface 80, and/or the inner surface 82 may increase the strength, rigidity, and/or structural integrity of the lip 20. In addition, the continuous tack-offs 72 may impede or prevent gas flow between the tabletop 12 and the lip 20 during the blow-molding process because the continuous tack-off 72 may be generally disposed between the central portion 74 of the tabletop 12 and the lip 20.

In an exemplary embodiment, the continuous tack-offs 72 may include the touching, joining, contact, and/or engagement of at least a portion of the upper surface 14, the lower surface 16, the outer surface 80, and/or the inner surface 82, which may retain or maintain one or more of these surfaces in a generally fixed position. The touching, joining, contact, and/or engagement of the upper surface 14, the lower surface 16, the outer surface 80, and/or the inner surface 82 may provide additional support and may increase the strength, rigidity, and/or structural integrity of a portion of the tabletop 12.

The continuous tack-offs 72 may have a double-wall thickness because it may be the mating of two or more walls or surfaces, such as the upper surface 14, the lower surface 16, the outer surface 80, and/or the inner surface 82. The double-wall thickness may increase the strength, rigidity, and/or structural integrity of the continuous tack-off 72 and/or a portion of the tabletop 12 After reviewing this disclosure, one skilled in the art will appreciate that the continuous tack-offs 72 may be formed from other portions of the tabletop 12 or other suitable structures.

The outer surface 80 of the lip 20 may extend about the perimeter 18, and the outer surface 80 may form an outer edge of the tabletop 12. The outer surface 80 of the lip 20 may be oriented substantially normal or perpendicular to the upper portion 14, the lower portion 16, and/or the generally planar portion 28 of the tabletop 12. The inner surface 82 of the lip 20 may be disposed generally parallel or at an angle relative to the outer surface 80. At least a portion of the inner surface 82 and the outer surface 80 of the lip 20 may be separated by a space or a gap. For example, a hollow interior portion may be at least partially disposed between the inner surface 82 and the outer surface 80. The hollow interior portion may be formed during the molding process. For example, if the tabletop 12 is constructed from blow-molded plastic, the hollow interior portion may be at least partially disposed between the inner surface 82 and the outer surface 80 during the blow-molding process. The inner and outer surfaces 80, 82 of the lip 20 do not have to be separated by a space or a gap, and all or a portion of the inner and outer surfaces 80, 82 may touch, contact, join, mate, or engage. This may allow one or more portions of the inner and outer surfaces 80, 82 of the lip 20 to be separated by a gap, and other portions of the inner and outer surfaces 80, 82 of the lip 20 may touch, contact, join, mate, or engage.

The tabletop 12 may include one or more engagement structures, such as blow points 84. The exemplary tabletop 12 shown in FIGS. 1-4 includes four blow points 84A-84D, and the blow points 84 may be implemented in pairs. For instance, a first blow point 84A and a second blow point 84B may be implemented together, and a third blow point 84C and a fourth blow point 84D may be implemented together. The blow points 84 may be implemented in other pairs or arrangements, such as the first blow point 84A and the fourth blow point 84D may be implemented together, the second blow point 84B and the third blow point 84C may be implemented together, etc.

The blow points 84 may be sized and configured to receive a blow pin during a blow-molding process or other formation process. In general, to introduce gas into a structure during the blow-molding process, a blow pin may be introduced into a blow point (e.g., the blow point 84). When the blow pin is disposed in the blow point 84, gas may flow through the blow pin and into the structure during the blow-molding process. In greater detail, a parison of molten plastic, such as HDPE, may be positioned in a mold during the blow-molding process. One or more blow pins may be inserted or disposed in the one or more blow points 84, and gas may be introduced into the structure. The closing of the mold and insertion of gas into the parison of molded plastic may facilitate forming of the molded plastic structure, such as the tabletop 12.

In the exemplary embodiment shown in FIGS. 1-4, a portion of the one or more blow points 84 may be disposed in and/or formed by a portion of the lower surface 16 of the tabletop 12. Another portion of the one or more blow points 84 may be disposed in and/or formed by a portion of the inner surface 82 of the lip 20. Thus, a first portion of the blow portions 84 may be formed or disposed in the lower surface 16 of the tabletop 12, and a second portion of the blow portions 84 may be formed or disposed in the inner surface 82 of the lip 20. The blow points 84 may include a hollow interior portion, which may be in fluid communication with the hollow interior portion of the tabletop 12.

A continuous tack-off 72 may be disposed between all or substantially all the remaining portions of the lip 20 (e.g., the portions of the lip 20 that do not include the blow points 84) and the body 74 of the tabletop 12. Thus, in an exemplary embodiment, the inner surface 82 of the lip 20 may include one or more blow points 84, and the blow points 84 may include a hollow interior portion that is in fluid communication with a hollow interior portion of the tabletop 12 and/or a hollow interior portion of the lip 20. One or more continuous tack-offs 72 may be disposed between the blow points 84. For example, a continuous tack-off 72 may be disposed between two blow points 84, and a first end of the continuous tack-off 72 may be disposed at least proximate a first blow point 84 and a second end of the continuous tack-off 72 may be disposed at least proximate a second blow point 84. The blow points 84 may be disposed in pairs and one or more continuous tack-offs 72 may be disposed between the pairs of blow points 84.

The lip 20 may include hollow interior portions, and the hollow interior portions may be disposed between the inner and outer surfaces 80, 82 of the lip 20. Additionally, and/or alternatively, the inner and outer surfaces 80, 82 of the lip 20 may touch, contact, join, mate, or engage, which may create a substantially solid structure, such as a compression edge. The hollow interior portion of the blow points 84 may be fluidly coupled to hollow interior portions of the tabletop 12 and/or the hollow interior portions of the lip 20. The continuous tack-offs 72 may prevent or substantially prevent fluid flow between the hollow interior portions of the lip 20 and the hollow interior portions of the tabletop 12.

In an exemplary embodiment, the tabletop 12 may include two or more flow pathways, and the flow pathways may be used during the blow-molding process to form the tabletop 12. For example, a first flow pathway may include a hollow interior portion of the lip 20 and a hollow interior portion of one or more of the blow points 84. A second flow pathway may include the hollow interior portion of the tabletop 12 and a hollow interior portion of one or more of the blow points 84. The second flow pathway may be at least substantially separated from the first flow pathway by the continuous tack-offs 72. Thus, in this exemplary embodiment, fluid (such as a gas) may flow between the hollow interior portions of the blow points 84 and hollow interior portions of the lip 20, and/or fluid may flow between the hollow interior portions of the blow points 84 and hollow interior portions of the tabletop 12. In this exemplary embodiment, fluid communication between the first fluid flow pathway (which may include fluid flow between the hollow interior portions of the lip 20 and the hollow interior portions of the blow points 84) and the second fluid flow pathway (which may include fluid flow between the hollow interior of the body portion 74 of the tabletop 12 and the hollow interior portions of the blow points 84) may occur via the one or more blow points 84.

In the exemplary embodiment shown in FIGS. 1-4, the continuous tack-off 72 may be disposed about all or substantially all the lip 20 except the blow points 84. In this exemplary embodiment, the continuous tack-off 72 may have a length approximately equal to all or a substantial portion of a length of the lip 20 except for portions of the lip 20 with the blow points 84. The length of the lip 20 may be measured around the perimeter 18 of the tabletop 12, and the continuous tack-off 72 may have a length that is substantially equal to the length of the lip 20, which may or may not include the blow points 84. A substantial portion of the lip 20 may include at least about ninety percent (90%), at least about ninety-five percent (95%), at least about ninety-eight percent (98%), or more of the lip 20. After reviewing this disclosure, one skilled in the art will appreciate that the length of the continuous tack-off 72 may be larger or smaller, or other suitable percentages of the length of the lip 20.

In some exemplary embodiments, the continuous tack-off 72 may extend along one or more sections of the tabletop 12, such as sections 86. For example, the tabletop 12 may include four sections 86A-86D, such as shown in FIG. 4. The exemplary sections may include a first section 86A that is at least partially disposed along a first side 22, a second section 86B that is at least partially disposed along an end 26 and one or more corners 24, a third section 86C that is at least partially disposed along a second side 22, and a fourth section 86D that is at least partially disposed along an end 26 and one or more corners 24. As shown in FIG. 4, the second and fourth sections 86B and 86D may extend generally along a width 90 of the tabletop 12, and the second and fourth sections 86B and 86D may include one or more corners 24. The first and third sections 86A and 86C may extend along a length 92 of the tabletop 12. In other exemplary embodiments, one or more of the sections 86 may include only the sides 22, the corners 24, and/or the ends 26, or any desired combination of the sides 22, the corners 24, and/or the ends 26. After reviewing this disclosure, one skilled in the art will appreciate that the sections 86 may have different shapes, sizes, configurations, and/or arrangements depending, for example, upon the type of table 10. One skilled in the art will also appreciate, after reviewing this disclosure, that the table 10 may include any desired number of continuous tack-offs 72 and sections 86.

One or more of the sections 86 may be disposed between the blow points 84. For instance, an exemplary embodiment of the tabletop 12 may include four blow points 84A-84D, and the blow points 84 may be disposed at least proximate the corners 24. For example, the blow points 84 may be disposed along the sides 22 and proximate the corners 24. In greater detail, as shown in FIG. 4, the blow points 84A-84D may be disposed along the sides 22 and at least proximate the corners 24. After reviewing this disclosure, one skilled in the art will appreciate that the blow points 84 may also be spaced apart from the corners 24, and the blow points 84 may be disposed in other locations, such as the ends 26.

As shown in FIG. 4, the first section 86A, which may be referred to as a side section, may be disposed between the first blow point 84A and the second blow point 84B. Similarly, the third section 86C may be disposed between the third blow point 84C and the fourth blow point 84D. The second section 86B may be disposed between the second blow point 84B and the third blow point 84C, and the fourth section 86D may be disposed between the fourth blow point 84D and the first blow point 84A. After reviewing this disclosure, one skilled in the art will understand that the tabletop 12 may include any number of blow points 84 and sections 86 depending, for example, upon the size, shape, configuration, and/or arraignment of the table 10 and/or tabletop 12.

In some embodiments, one or more of the sections 86 may not include the continuous tack-off 72. For instance, only the first section 86A may include the continuous tack-off 72, only the first section 86A and the third section 86C (e.g., the sides 22) may include the continuous tack-off 72, only the second and fourth sections 86B and 86D (e.g., the ends 26) may include the continuous tack-off 72, etc. It will also be appreciated that other structures or features may be disposed between the blow points 84. For example, in addition to a continuous tack-off 72 being disposed between two blow points 84, other structures or features may be disposed between the blow points 84, such as strengthening members, frame attachment points, crossbar receiving portions, engagement structures, and the like.

If the section 86 includes a continuous tack-off 72, the continuous tack-off 72 may have a length generally equal to or less than a length of the section 86. For example, if the section 86 includes a continuous tack-off 72 and the continuous tack-off 72 extends along the length of the section 86, the continuous tack-off 72 may have a length generally equal to or less than a length of the section 86. For instance, in an embodiment in which the continuous tack-off 72 is included in the first section 86A, the continuous tack-off 72 may have a length generally equal to or greater than ninety-five percent (95%) of a distance between the first blow point 84A and the second blow point 84B.

As shown in FIG. 4, the blow points 84 may be spaced apart from the corners 24 of the tabletop 12, and the blow points 84 may be disposed along the sides 22 of the tabletop 12. The blow points 84 may also be adjacent, at least partially disposed in, or disposed in the corners 24. The blow points 84 may also be at least partially disposed in or disposed in the ends 26 or other suitable portions of the tabletop 12. For instance, the first blow point 84A may be disposed proximate a first corner 24A, and the first corner 24A may be connected to a first end 26A. The first end 26A may be connected to a second corner 24B, and the second blow point 84B may be disposed proximate the second corner 24B. After revieing this disclosure, one skilled in the art will appreciate that the blow points 84 may be disposed in other portions of the tabletop 12.

The lip 20 and/or the continuous tack-offs 72 may have generally the same size, shape, configuration, and/or arrangement in the sides 22, the corners 24, and/or the ends 26. For example, each corner 24 may include the continuous tack-off 72, and a length of the continuous tack-off 72 in one or more of the corners 24 may be generally the same. Advantageously, the corners 24 may have more uniform properties and/or characteristics if the continuous tack-offs 72 have generally the same length. As shown in the accompanying figures, the continuous tack-offs 72 may span the entire radius or curved portion of the corner 24. That is, the continuous tack-offs 72 may extend from where the corner 24 begins on one side of the tabletop 12 to where the corner 24 ends on another side of the tabletop 12. If the corner 24 includes a continuous tack-off 72 and lip 20, and the continuous tack-off 72 and lip 20 have generally uniform and consistent shapes, sizes, configurations, and/or arrangements, the corner may have generally uniform properties and/or characteristics.

In some embodiments, the tabletop 12 may include one or more features and/or engagement structures, such as the exemplary structural features 100 shown in FIG. 4. One skilled in the art will appreciate with the benefit of this disclosure that the tabletop 12 may include two or more structural features 100, which may be positioned and spaced as desired. The structural feature 100 may be disposed on the inner surface 82 of the lip 20. The structural feature 100 may be disposed between two or more of the blow points 84. For instance, the structural feature 100 may be disposed between the first and second blow points 84A and 84B. In some embodiments, the structural feature 100 may be similar to those described in U.S. Pat. No. 11,324,311, which is incorporated by reference in its entirety.

The structural feature 100 may be disposed between the lower portion 16 of the tabletop 12 and the inner surface 82 of the lip 20. The structural feature 100 may be sized and configured to add strength, rigidity, and/or structural integrity to the lip 20. For instance, the structural feature 100 may act against an inward force applied to the outer surface 80 of the lip 20. In some embodiments, the structural feature 100 may include a hollow interior portion, and the hollow interior portion may be in fluid communication with a hollow interior portion of the lip 20. In other embodiments, the structural feature 100 may be substantially solid (e.g., no or substantially no hollow interior portion). The structural feature 100 may also include a hollow interior portion that is in fluid communication with a hollow interior portion of the tabletop 12.

Additionally, or alternatively, the tabletop 12 may include one or more features and/or engagement structures, such as an exemplary fastener receiver 102 shown in FIG. 4. One skilled in the art will appreciate with the benefit of this disclosure that the tabletop 12 may include two or more fastener receivers 102, which may be positioned or spaced as desired. The fastener receiver 102 may be disposed on the inner surface 82 of the lip 20. The fastener receiver 102 may be disposed between two or more of the blow points 84. For instance, the fastener receiver 102 may be disposed between the first and second blow points 84A and 84B, and the fastener receiver 102 may be sized and configured to receive a fastener. The fastener could be a mechanical device such as a screw, bolt, pin, clip, clasp, and the like. The fastener could also be a non-mechanical device such as an adhesive, glue, and the like. The fastener receiver 102 may facilitate attachment of the frame 36 to the tabletop 12. In greater detail, the fastener receiver 122 may facilitate connection of the siderails 38, 40 of the frame 36 to the tabletop 12. The fastener receiver 102 may also facilitate attachment of other structures to the tabletop 12, such as the support structures 30, and the fastener receiver 102 may be sized and configured to receive one or more parts, components, structures, and the like.

The fastener receiver 102 may be disposed between the lower portion 16 of the tabletop 12 and the inner surface 82 of the lip 20. In some embodiments, the fastener receiver 102 may include a hollow interior portion, and the hollow interior portion may be in fluid communication with a hollow interior portion of the lip 20. In other embodiments, the fastener receiver 102 may be substantially solid (e.g., no or substantially no hollow interior portion). The fastener receiver 102 may include a hollow interior portion that is fluid communication with a hollow interior portion of the tabletop 12.

As shown in FIG. 3, the frame 36 may touch, contact, and/or abut one or more of the blow points 84. In particular, the siderails 38, 40 of the frame 36 may touch, contact, and/or abut an inner surface of one or more of the blow points 84. The frame 36 may be spaced apart from the inner surface 82 of the lip 20. In other embodiments, the frame 36 may be disposed between the blow points 84, and/or the frame 36 may touch, contact, and/or abut one or more portions of the lip 20. For example, the siderails 38, 40 of the frame 36 may be at least partially disposed between the blow points 84, and/or the siderails 38, 40 may touch, contact, and/or abut a portion of the lip 20, such as the inner surface 82 of the lip 20. In an exemplary embodiment, an outer surface of the siderails 38, 40 may contact the inner surface 82 of the lip 20. The frame 36, the siderails 38, 40, the continuous tack-off 72, the blow points 84, the structural features 100, and/or the fastener receivers 102 may provide additional support, rigidity, and/or structural integrity to portions of the tabletop 12, such as the lip 20.

The frame 36 may touch, contact, and/or abut other portions of the tabletop 12, such as the structural features 100 and/or the fastener receivers 102. For example, the siderails 38, 40 of the frame 36 may touch, contact, and/or abut one or more of the blow points 84, the structural features 100, and/or the fastener receivers 102. The blow points 84, the structural features 100, and/or the fastener receivers 102 may include inner surfaces that are generally aligned and disposed in substantially the same plane, which may allow the siderails 38, 40 of the frame 36 to contact the inner surfaces of the blow points 84, the structural features 100, and/or the fastener receivers 102. The blow points 84, the structural features 100, and/or the fastener receivers 102 may allow the siderails 38, 40 of the frame 36 to be spaced apart from the inner surface 82 of the lip 20 by a distance, which may be a generally constant distance. Alternatively, and/or additionally, the generally aligned inner surfaces of the blow points 84, the structural features 100, and/or the fastener receivers 102 may allow a portion of the frame 36, such as the siderails 38, 40, to touch, contact, and/or about a portion of the lip 20, such as the inner surface 82 of the lip 20.

Figure 5A:
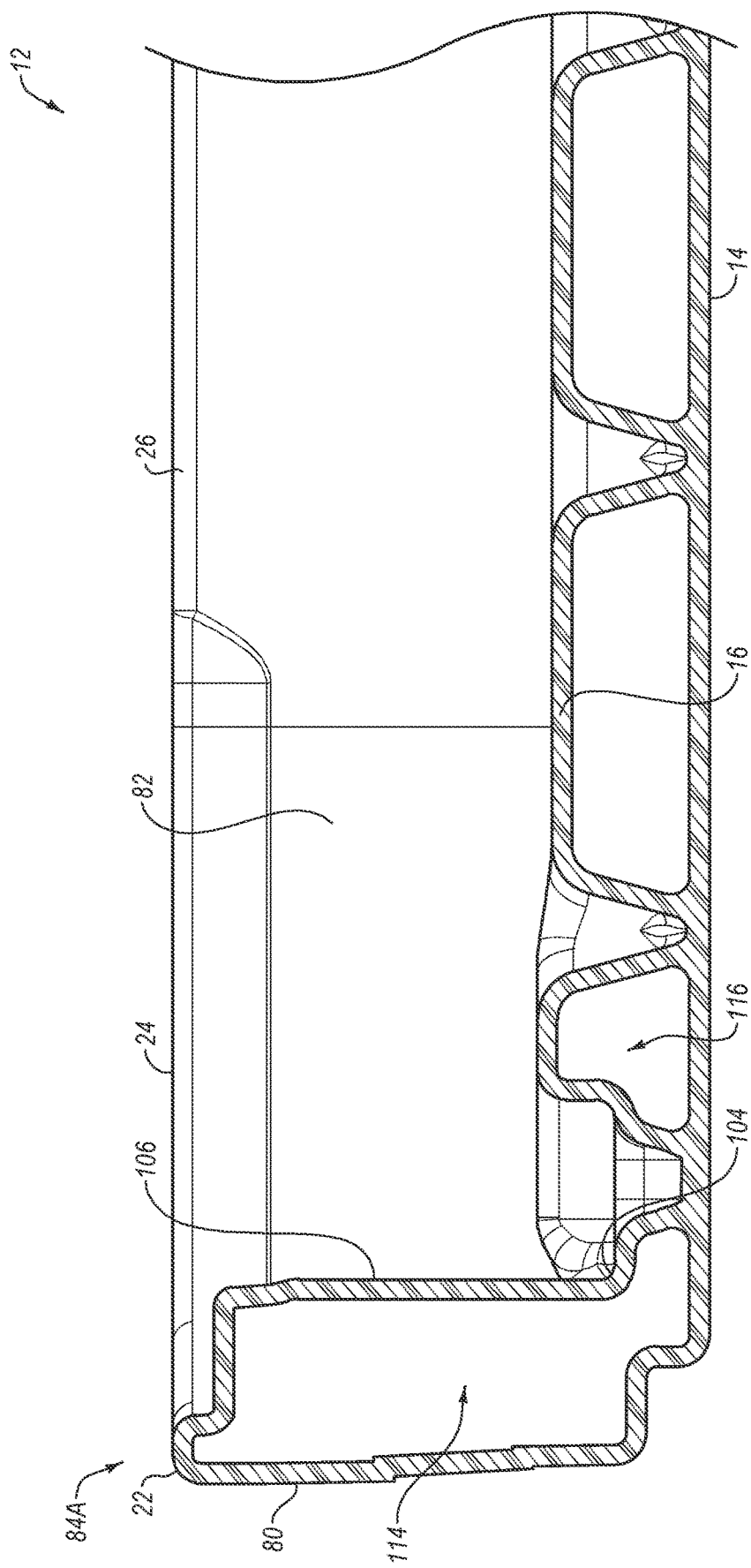
FIG. 5A is an enlarged sectional view of an exemplary portion of an embodiment of a tabletop.
Figure 5B:
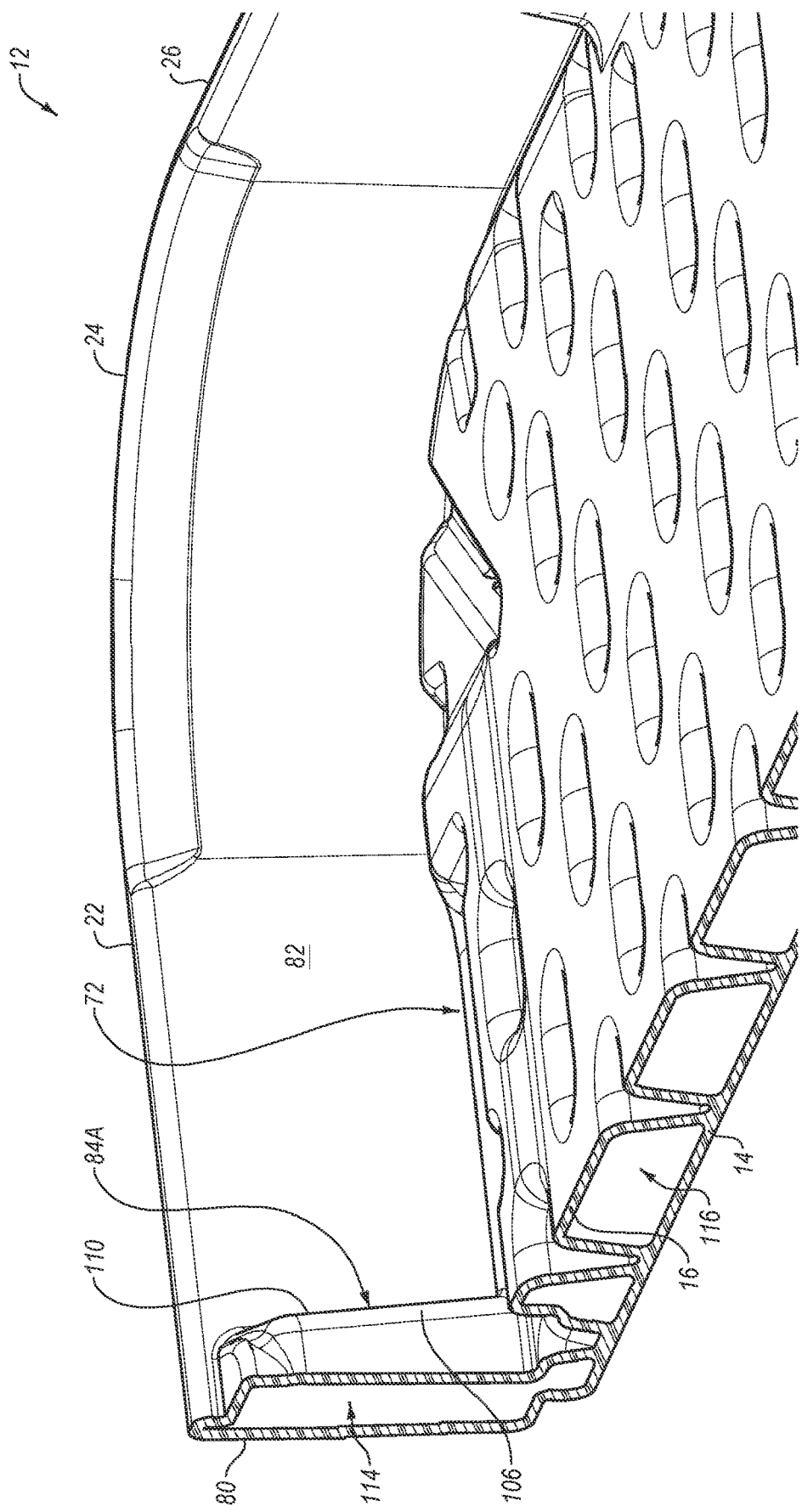
FIG. 5B is an enlarged sectional view of an exemplary portion of an embodiment of a tabletop.
Figure 5C:
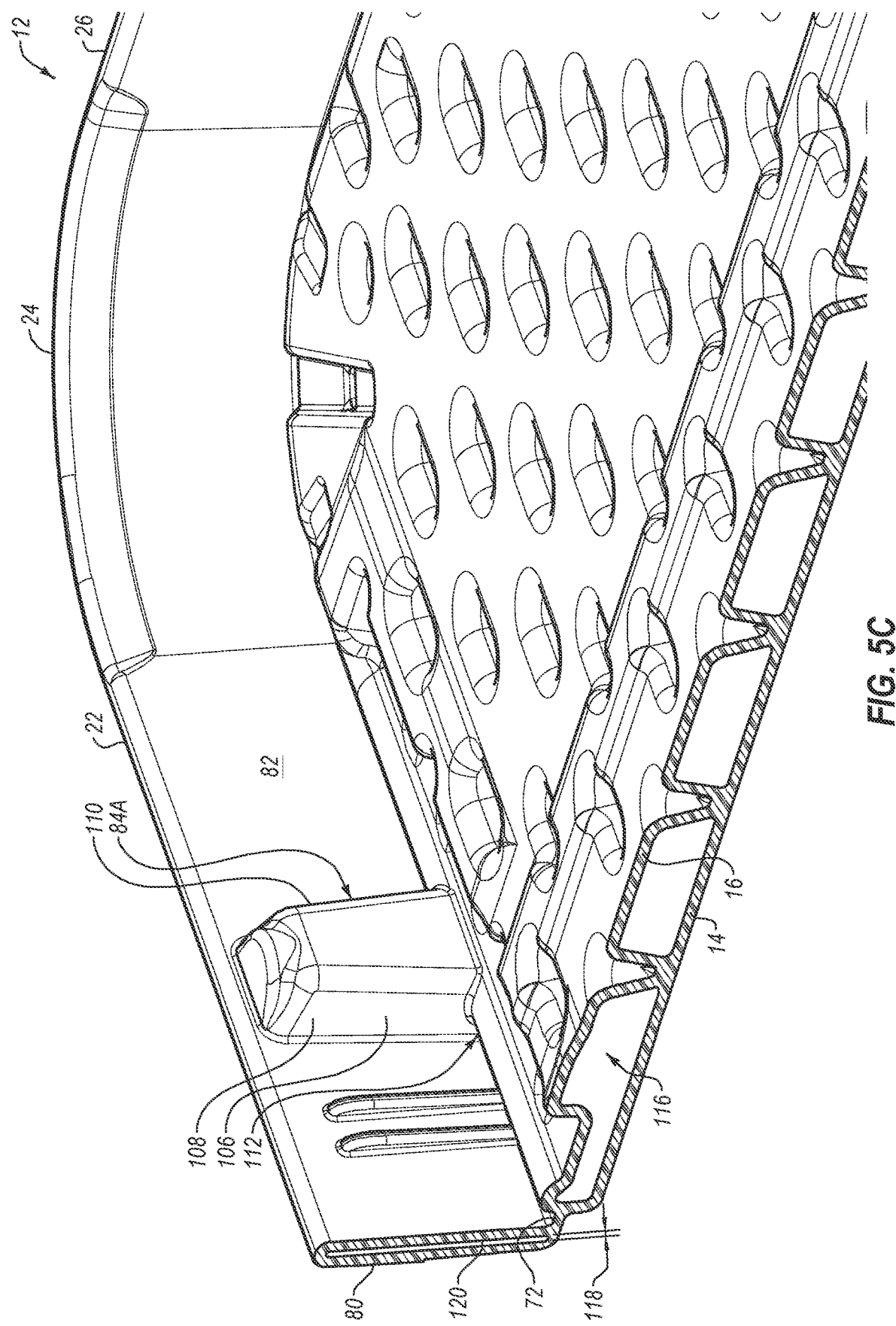
FIG. 5C is an enlarged sectional view of an exemplary portion of an embodiment of a tabletop.
Figure 5D:
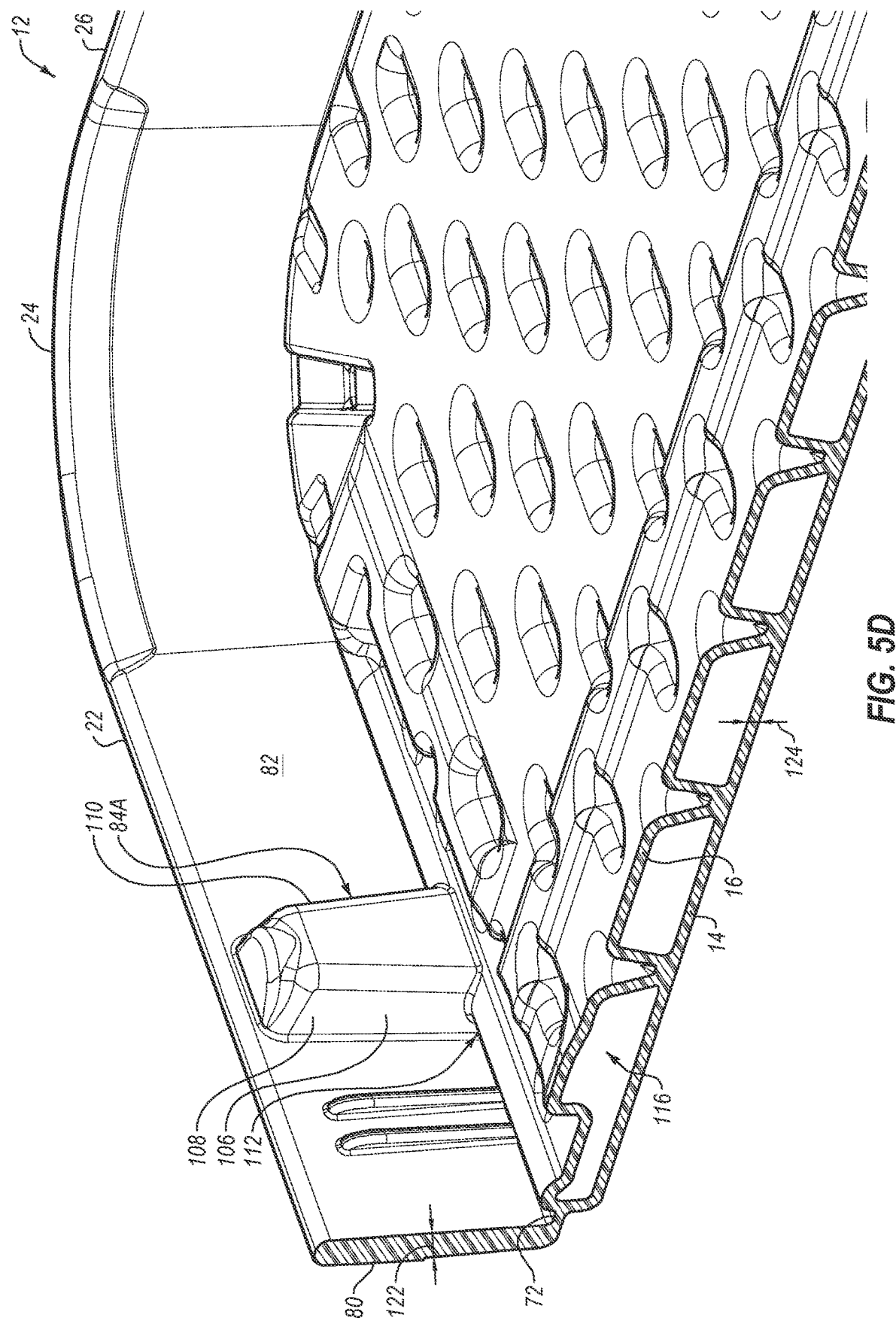
FIG. 5D is an enlarged sectional view of an exemplary portion of an embodiment of a tabletop.

FIGS. 5A-5D, are sectional views of the exemplary tabletop 12. FIGS. 5A and 5B are sectional view through the exemplary first blow point 84A. FIG. 5A is a planar view of the tabletop 12 12 through the first blow point 84A, and FIG. 5B is a perspective view of the tabletop 12 through the first blow point 84A. FIGS. 5C and 5D are sectional views spaced apart from the first blow point 84A.

Referring to FIGS. 5A-5D, the first blow point 84A may include a first portion 104, and the first portion 104 may be connected to the upper portion 14 and/or the lower portion 16 of the tabletop 12. A second portion 106 of the first blow point 84A may be connected to and/or extend inwardly from the inner surface 82 of the lip 20. In some exemplary embodiments, the blow point 84, including the first portion 104 and the second portion 106, may be integrally formed with the inner surface 82 of the lip 20 and the lower portion 16 of the tabletop 12. The blow point 84 may be at least partially formed from or connected to the lower portion 16 of the tabletop 12, and the blow point 84 may be at least partially formed from or connected to the inner surface 82 of the lip 20.

In an exemplary configuration, the blow point 84A may have a generally rectangular configuration, and the first portion 104 and/or the second portion 106 may form a portion of the generally rectangular configuration. For instance, the first portion 104 and/or the second portion 106 may be disposed substantially parallel or substantially perpendicular to the outer surface 80 and/or inner surface 82 of the lip 20. Additionally, one or more sides of the blow point 84A, such as sides 108 and 110, may be disposed substantially parallel or perpendicular to one another. Such configuration may help positioning and securing a portion of a frame (e.g., the frame 36) or portion thereof (e.g., siderails 38, 40) to the tabletop 12. One skilled in the art will appreciate that the blow point 84A may have assorted sizes, shapes, configurations, and/or arrangements depending, for example, upon the size, shape, configuration, and/or arrangement of the tabletop 12 and/or the frame 36. It will also be appreciated that the blow points 84 may have similar or different sizes, shapes, configurations, and/or arrangements depending, for example, upon the type of the tabletop 12 and/or the frame 36.

In the exemplary embodiment shown in FIG. 5A, the continuous tack-off 72 may not be disposed within the first blow point 84A. For instance, the continuous tack-off 72 may be interrupted by the first blow point 84A, or a continuous tack-off 72 may be disposed on one or both sides of the first blow point 84A. One or more ends 102 of the continuous tack-off 72 may be disposed at least adjacent or proximate to the first blow point 84A. With reference to FIGS. 4-5D, the continuous tack-off 72 may be interrupted in one or more locations, and/or the continuous tack-off 72 may include one or more sections. For example, one, two, or more of the blow points 84 may interrupt the continuous tack-off 72. Thus, the continuous tack-off 72 may include ends 112, and the ends 112 may be disposed at least proximate the blow points 84. It will be appreciated that the tabletop 12 may include more than one continuous tack-off 72, and the continuous tack-off 72 may include any number of interruptions and/or segments.

With reference to FIGS. 5A and 5B, the blow point 84 may include a hollow interior portion or hollow internal volume 114. In an exemplary embodiment, the first portion 104 and/or the second portion 106 of the blow point 84 may include the hollow interior portion 114. The hollow interior portion 114 of the blow point 84 may be fluidly coupled and in fluid communication with a hollow interior portion or hollow internal volume 116 of the tabletop 12. The hollow interior portion 116 may be at least partially disposed between the upper portion 14 and the lower portion 16 of the tabletop 12. Accordingly, a fluid pathway may be disposed between the hollow interior portion 114 of the blow point 84 and the hollow interior portion 116 of the tabletop 12, which may enable gas to flow between the blow point 84 and the tabletop 12. For instance, if the tabletop 12 is constructed from blow-molded plastic, gas may flow from the hollow interior portion 114 of the blow point 84 to the hollow interior portion 116 of the tabletop 12.

In some exemplary embodiments, the hollow interior portion 114 of the blow point 84 may not be fluidly coupled to the hollow interior portion 116 of the tabletop 12. For instance, the hollow interior portion 114 of the first blow point 84A may be fluidly coupled to the hollow interior portion 116 of the tabletop 12 during a blow-molding process, which may enable gas to pass from the first blow point 84A to the hollow interior portion 116 of the tabletop 12. Following the blow-molding process, the hollow interior portion 114 of the first blow point 84A may be separated from the hollow interior portion 116 of the tabletop 12. The hollow interior portion 114 of the blow point 84 may also not be in fluid communication with the hollow interior portion 116 of the tabletop 12 because structures, such as the continuous tack-off 72, may be disposed between the blow point 84 and the tabletop 12.

The number of blow points 84 may vary depending, for example, upon the size and configuration of the tabletop 12. For example, a larger tabletop 12 may include more blow points 84 than a smaller tabletop 12. The blow points 84 may have a similar or identical structure as the exemplary first blow point 84A described above. For instance, the first blow point 84A and the second blow point 84B may have generally the same or identical configurations, and the first blow point 84A and the second blow point 84B may each include the hollow interior portion 114. The hollow interior portion 114 of the first and second blow points 84A, 84B may be fluidly coupled to the hollow internal volume 116 of the tabletop 12. Accordingly, in this exemplary embodiment, gas may enter the hollow interior portion 116 of the tabletop 12 from both the first blow point 84A and the second blow point 84B. It will be appreciated that the blow points 84 may have similar or different shapes, sizes, configurations, and/or arrangements depending, for example, upon the size and type of table.

As shown in FIG. 5C, a distance or gap 118 may be disposed between the inner surface 82 and the outer surface 80 of the lip 20. Thus, a portion of the lip 20 may include a hollow interior portion or hollow internal volume 120 and, the hollow interior portion 120 may be disposed in all or a portion of the lip 20. For example, the hollow interior portion 120 may be disposed in one or more portions of the lip 20, and the hollow interior portion 120 may be disposed about at least a portion of the perimeter 18 of the tabletop 12. The blow points 84, however, may not include the hollow interior 120 because the blow points 84 may include the hollow interior 114. The hollow interior 120 of the lip 20 may be in fluid communication with the hollow interior 114 of the blow point 84. In other exemplary embodiments, the hollow interior 120 may be disposed in one or more sections (e.g., the sections 86) of the lip 20. For instance, in exemplary embodiments in which the continuous tack-off 72 is disposed in the sides 22 and/or side sections (e.g., the first and third sections 86A and 86C) of the tabletop 12, the hollow interior 120 may be disposed in these portions of the lip 20.

In some exemplary embodiments, the distance 118 between the outer wall 80 and the inner wall 82 of the lip 20 may be substantially constant. For example, the distance 118 may be substantially constant between blow points 84, such as between the first blow point 84A and the second blow point 84B. In another exemplary embodiment, the distance 118 may vary along the width and/or height of the lip 20. For instance, the portion of the lip 20 proximate the tabletop 12 may have a larger distance 118 separating the outer and inner walls 80, 82 than the portion of the lip 20 disposed towards a distal end of the lip 20.

Advantageously, the inner and outer surfaces 80 and 82 of the lip 20 may be disposed in close proximity. For example, the inner and outer surfaces 80 and 82 may be spaced apart by about 5 millimeters (0.2 inches) or less, about 4 mm (0.16 in.) or less; about 3 mm (0.12 in.) or less; about 2 mm (0.08 in.) or less; about 1 mm (0.04 in.) or less; about 0.5 mm (0.02 in.) or less. The closely spaced or touching outer and inner surfaces 80 and 82 may provide additional strength, rigidity, and/or structural integrity to the lip 20 and/or the tabletop 12.

Additionally, and/or alternatively, the inner and outer walls 80, 82 of the lip 20 do not have to be separated by the distance 118, and the inner and outer walls 80, 82 may touch, contact, and/or abut, which may form a compression edge. One or more portions of the lip 20 may include inner and outer walls 80, 82 that touch, contact, and/or abut. For example, all or a portion of one or more sections (e.g., the sections 86) of the lip 20 may include inner and outer walls 80, 82 that touch, contact, and/or abut. For instance, the sides 22 and/or side sections (e.g., the first and third sections 86A and 86C) of the tabletop 12 may include a lip 20 with the inner and outer walls 80, 82 touching, contacting, and/or abutting, which may form at least a portion of a compression edge.

The hollow interior portion 120 of the lip 20 may form at least a portion of a pathway, and gas may flow through the pathway during the blow molding process. For example, the first flow pathway may include the hollow interior portion 120 of the lip 20 and the hollow interior portion 114 of the blow point 84. During the blow molding process, gas may be introduced to the hollow interior portion 120 of the lip 20 via the hollow interior portion 114 of the blow point 84. The flow of the gas into the hollow interior portion 120 of the lip 20 may at least partially form the lip 20 during the blow molding process. The continuous tack-off 72 may prevent gas flow between the hollow interior portion 120 of the lip 20 and the hollow interior portion 116 of the tabletop 12.

The hollow interior portion 120 may be disposed in a central portion of the lip 20. For instance, the hollow interior portion 120 may be centrally disposed between the outer surface 80 and the inner surface 82. The hollow interior portion 120 may also be centrally disposed between an upper portion and a lower portion of the lip 20. The central portion may include about thirty percent (30%), about forty percent (40%), about fifty percent (50%), about sixty percent (60%), or more of the lip 20. The hollow interior portion 120 may also be disposed towards the outer surface 80, the inner surface 82, the upper portion, and/or the lower portion of the lip 20.

In the exemplary embodiment shown in FIG. 5D, all or a portion of the lip 20 may have an at least substantially solid portion or configuration. Thus, all or a portion of the lip 20 may include a hollow interior, such as the hollow interior portion 120, and all or a portion of the lip 20 may include an at least substantially solid portion. The at least substantially solid portion of the lip 20 may be disposed between the blow points 84, and the lip 20 may include one or more at least substantially solid portions. The lip 20 may also include one or more hollow interior portions, such as the hollow interior portions 120. For example, the at least substantially solid portions of the lip 20 may be disposed at or near a center portion of a section of the lip 20 that includes the continuous tack-off 72, such as the sections 86. The portions of the lip 20 proximate the blow points 84 may include the hollow interior portions 120. If the tabletop 12 is constructed from blow-molded plastic, the hollow interior portions 120 and the at last substantially solid portions of the lip 20 may be formed during or after the blow-molding process.

In the solid portions of the lip 20, the inner surface 82 and the outer surface 80 of the lip 20 may touch or may be attached, joined, mated, and/or engaged. The solid portion of the lip 20 may have a thickness 122, and the thickness 122 may be approximately twice a thickness 124 of the lower portion 16 or upper portion 14 of the tabletop 12. The thickness 122 may be a double wall thickness because it may be twice the wall thickness of the tabletop 12. The continuous tack-off 72 may be disposed between the solid portions of the lip 20 and the lower portion 16 and/or the upper portion 14 of the tabletop 12. The continuous tack-off 72 may also be disposed between the solid portions of the lip 20 and the central portion 74 of the tabletop 12. Alternatively, and/or additionally, the continuous tack-off 72 may be disposed between the hollow portions 120 of the lip 20 and the lower portion 16 and/or the upper portion 14 of the tabletop 12, and/or the central portion 74 of the tabletop 12. Thus, the continuous tack-off 72 may be disposed between the hollow or solid portions of the lip 20 and the tabletop 12.

In some embodiments, the lip 20 may include one or more portions, such as the hollow interior 120 and the at least substantially solid portions (e.g., portions without the hollow interior 120). For instance, referring to FIGS. 4, 5C, and 5D, the first section 86A between the first blow point 84A and the second blow point 84B may include the continuous tack-off 72, and the continuous tack-off 72 may be disposed between the lip 20 and the tabletop 12. The lip 20 may include one or more portions that include the hollow interior volume 120 and/or one or more portions without the hollow interior volume 120. In other embodiments, the entire portion of the lip 20 along the first section 86A between the first blow point 84A and the second blow point 84B may include the hollow interior volume 120 and/or may be at least substantially solid.

In the foregoing paragraphs, the lip 20 is described with reference to the exemplary tabletop 12. It will be appreciated that the lip 20 is not limited to implementation with the tabletop 12. Instead, the lip 20 may be implemented in various structures, which such as round tables, personal tables, conference tables, seminar tables, folding tables, recreation tables, adjustable height folding tables, card tables other types of furniture (e.g., chairs, stacking chairs, kids chairs, benches, picnic tables, etc.) and/or structures (e.g., storage sheds, deck boxes, coolers, garden boxes, playground equipment, etc.). For example, the lip 20 may be implemented in fold-in-half tabletops. Some examples of the fold-in-half tabletops are shown and described in U.S. Pat. Nos. 7,278,361 and 8,555,791, each of which is incorporated by reference in its entirety.

In some embodiments, the table 10 may have other features or aspects, such as being sized and configured to be stacked with one or more additional tables. Exemplary embodiments of such tables are shown and described in U.S. Pat. Nos. 8,397,652; 8,408,146; 8,622,007; 9,138,050; and 8,347,795; each of which is incorporated by reference in its entirety.

The continuous tack-offs 72 may provide surprising and unexpected results because, at the time of the invention, one skilled in the art would have thought the continuous tack-offs 72 would prevent the lip 20 from correctly forming. For example, one skilled in the art would have thought the continuous tack-off 72 would prevent the lip 20 from correctly forming because there would not be sufficient gas flow and/or gas pressure during the blow-molding process to form the lip 20.

The continuous tack-off 72, however, provides the surprising and unexpected result that a tabletop 12 can be created with the lip 20 at least substantially separated from the central or body portion 74 of the tabletop 12 by the continuous tack-off 72. In particular, it was surprising and unexpected to one skilled in the art at the time of the invention that the lip 20 could be formed with the continuous tack-off 72 during the blow-molding process because one skilled in the art would have thought that the continuous tack-off 72 would create significant obstacles and difficulties that would lead to failure during the blow-mold process. For example, one skilled in the art would have thought that the gas flow and/or pressure would be insufficient to form the lip 20 with the continuous tack-offs 72 disposed between the central portion 74 of the tabletop 12 and the lip 20. Additionally, one skilled in the art would have thought that the gas flow and/or pressure would be insufficient to create the compression edge and/or the hollow interior volume 120 of the lip 20 because of the continuous tack-off 72. Further, one skilled in the art would have thought that the lip 20 would not properly form because, for example, of the considerable distance that the gas would have to travel and/or the gas pressure would decrease to such an amount that the lip 20 could not be correctly formed. One skilled in the art would have also thought that the continuous tack-off 72 would impede or prevent gas flow such that it would preclude the lip 20 from properly forming during the blow-mold process, especially because the continuous tack-offs 72 may be disposed between at least a majority and/or at least substantially all of the tabletop 12 and the lip 20.

Another surprising and unexpected result is the continuous tack-offs 72 can have a much greater length than a traditional tack-off, such as the depressions 60, and the lip 20 of the tabletop 12 can be properly formed during the blow-molding process. For example, large, generally planar structures constructed from blow-molded plastic may include a plurality of depressions 60 in a generally uniform pattern but the lengths of the depressions 60 typically have a length of one (1) inch or less to facilitate gas flow and/or minimize disruptions, disturbances, etc. in the gas flow. Contrary to what was expected by one skilled in the art, the continuous tack-offs 72 could have a length ten, twenty, thirty, forty, fifty, sixty, or more times the length of the traditional depression 60. Moreover, the lip 20 could be properly formed during the blow-molding process with the continuous tack-offs 72 disposed between the central body portion 74 of the tabletop 12 and the lip 20.

The terms and words used in the following description and claims are not limited to the bibliographical meanings but are merely used to enable a clear and consistent understanding of the disclosure. It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

One of ordinary skill in the art may appreciate after reviewing this disclosure that the tables, and parts and components of the tables, disclosed herein may have various aspects, features, characteristics and configurations. Further, a table may have any suitable number of aspects, features, characteristics, and configurations depending, for example, upon the intended use of the table.

Although this invention has been described in terms of certain preferred embodiments, other embodiments apparent to those of ordinary skill in the art are also within the scope of this invention. Accordingly, the scope of the invention is intended to be defined only by the claims which follow.

What is claimed is:

1. A blow-molded plastic structure constructed using a blow-molding process, the blow-molded plastic structure comprising:

a panel including an upper surface, a lower surface, and
a hollow interior portion disposed between the upper surface and the lower surface of the panel, the upper surface, the lower surface, and the hollow interior portion being integrally formed as part of a unitary, one-piece structure;
an outwardly extending lip, the outwardly extending lip including an outer surface and an inner surface;
a first blow point receiving portion at least partially disposed in the inner surface of the lip, the first blow point receiving portion sized and configured to receive a blow pin during a blow-molding process;
a second blow point receiving portion at least partially disposed in the inner surface of the lip, the second blow point receiving portion sized and configured to receive a blow pin during the blow-molding process; and
a continuous tack-off at least partially disposed between the panel and the lip, the continuous tack-off extending between the first blow point receiving portion and the second blow point receiving portion.

2. The blow-molded plastic structure of claim 1, further comprising:
a first flow pathway providing fluid communication between the first blow point receiving portion and a hollow interior portion of the lip during the blow-molding process; and
a second flow pathway providing fluid communication between the first blow point receiving portion, the hollow interior portion of the panel, and the second blow point receiving portion, the second flow pathway being at least substantially separated from the first flow pathway by the continuous tack-off.

3. The blow-molded plastic structure of claim 1, wherein the continuous tack-off includes a first portion disposed at least proximate the first blow point receiving portion and a second portion disposed at least proximate the second blow point receiving portion.

4. The blow-molded plastic structure of claim 1, further comprising a first fastener receiver at least partially disposed in the inner surface of the lip and a second fastener receiver at least partially disposed in the inner surface of the lip, the first fastener receiver and the second fastener receiver at least partially disposed between the first blow point receiving portion and the second blow point receiving portion.

5. The blow-molded plastic structure of claim 1, further comprising a first fastener receiver at least partially disposed in the inner surface of the lip and a second fastener receiver at least partially disposed in the inner surface of the lip, the first fastener receiver and the second fastener receiver at least partially disposed between the first blow point receiving portion and the second blow point receiving portion, an inner surface of the first fastener receiver generally aligned with and generally disposed in a planar configuration with an inner surface of the first blow point receiving portion, and an inner surface of the second fastener receiver generally aligned with and generally disposed in a planar configuration with an inner surface of the second blow point receiving portion.

6. The blow-molded plastic structure of claim 1, wherein the continuous tack-off is disposed between the lip and the panel on at least one side of the panel, at least one corner of the panel, and at least one end of the panel.

7. The blow-molded plastic structure of claim 1, wherein a length of the continuous tack-off is at least ninety-five percent (95%) of a length of a side of the panel.

8. The blow-molded plastic structure of claim 1, wherein the first blow point receiving portion is disposed at least proximate a first corner of the panel and the second blow point receiving portion is disposed at least proximate a second corner of the panel;
wherein a first fastener receiver is disposed between the first blow point receiving portion and the second blow point receiving portion;
wherein a second fastener receiver is disposed between the first blow point receiving portion and the second blow point receiving portion; and
wherein the inner surface of the lip has a generally planar configuration between the first blow point receiving portion and the second blow point receiving portion except where the first fastener receiver and the second fastener receiver are disposed.

9. The blow-molded plastic structure of claim 1, wherein a portion of the lower surface of the panel is integrally formed with a portion of the upper surface of the panel to form at least a portion the continuous tack-off.

10. The blow-molded plastic structure of claim 1, wherein the continuous tack-off is formed by mating two or more of the following surfaces: a portion of the outer surface of the lip, a portion of the inner surface of the lip, a portion of the lower surface of the panel, or a portion of the upper surface of the panel.

11. The blow-molded plastic structure of claim 1, wherein the first blow point receiving portion and the second blow point receiving portion are part of a plurality of pairs of blow point receiving portions;
wherein the plurality of pairs of blow point receiving portions comprises at least two pairs of blow point receiving portions;
wherein a first pair of blow point receiving portions includes the first blow point receiving portion and the second blow point receiving portion disposed on a first side of the panel;
wherein a second pair of blow point receiving portions includes a third blow point receiving portion and a fourth blow point receiving portion disposed on a second side of the panel;
wherein the continuous tack-off includes a first portion disposed between the first blow point receiving portion and the second blow point receiving portion; and
wherein the continuous tack-off includes a second portion disposed between the third blow point receiving portion and the fourth blow point receiving portion.

12. The blow-molded plastic structure of claim 11, wherein the continuous tack-off includes a third portion disposed between the first blow point receiving portion and the third blow point receiving portion;
wherein the continuous tack-off includes a fourth portion disposed between the second blow point receiving portion and the fourth blow point receiving portion; and
wherein a combined length of the first portion, the second portion, the third portion, and the fourth portion of the continuous tack-off is substantially equal to or greater than ninety-five percent (95%) of a perimeter of the panel.

13. The blow-molded plastic structure of claim 1, wherein a distance between the inner surface of the lip and the outer surface of the lip is substantially constant between the first blow point receiving portion and the second blow point receiving portion.

14. The blow-molded plastic structure of claim 1, wherein a first end of the continuous tack-off is disposed at least adjacent to the first blow point receiving portion and a second end of the continuous tack-off is disposed at least adjacent to the second blow point receiving portion; and wherein the lip and the continuous tack-off have a generally uniform size, shape, configuration, and arrangement between the first blow point receiving portion and the second blow point receiving portion to create a structure with generally uniform characteristics.

15. A blow-molded plastic structure constructed using a blow-molding process, the blow-molded plastic structure comprising:
- a panel including an upper surface, a lower surface, and a hollow interior portion;
- an outwardly extending lip including an outer surface and an inner surface;
- a first blow point receiving portion at least partially disposed in the inner surface of the lip, the first blow point receiving portion being sized and configured to receive a blow pin during the blow-molding process;
- a second blow point receiving portion at least partially disposed in the inner surface of the lip, the second blow point receiving portion being sized and configured to receive a blow pin during the blow-molding process; and
- a continuous tack-off extending between the first blow point receiving portion and the second blow point receiving portion.

16. The blow-molded plastic structure of claim 15, wherein the continuous tack-off is at least substantially disposed between the lip and the panel; and
wherein the continuous tack-off is at least substantially disposed between the lip and the panel except where the first blow point is located and where the second blow point is are located.

17. The blow-molded plastic structure of claim 15, wherein the continuous tack-off is at least substantially disposed between the lip and the panel expect where one or more of the following features are located: the first blow point, the second blow point, a fastener receiver, or a structural feature; and
wherein the lip has substantially the same size, shape, and configuration expect where one or more of the following features are located: the first blow point, the second blow point, the fastener receiver, or the structural feature.

18. The blow-molded plastic structure of claim 15, wherein the inner surface of the lip and the outer surface of the lip contact to form an at least substantially solid construction except where one or more of the following features are located: the first blow point, the second blow point, a fastener receiver, or a structural feature.

19. A blow-molded plastic structure constructed using a blow-molding process, the blow-molded plastic structure comprising:
- a panel constructed from blow-molded plastic, the panel including an upper surface, a lower surface, and a hollow interior portion, the upper surface, the lower surface, and the hollow interior portion being integrally formed as part of a unitary, one-piece structure;
- an outwardly extending lip including an inner surface and an outer surface;
- a plurality of blow point receiving portions at least partially disposed in the inner surface of the lip, the blow point receiving portions being sized and configured to receive a blow pin during the blow-molding process;
- a plurality of fastener receivers at least partially disposed in the inner surface of the lip, the fastener receivers being sized and configured to receive a fastener; and
- a continuous tack-off at least substantially disposed between the lip and the panel, the continuous tack-off extending between blow points of the plurality of blow points.

20. The blow-molded plastic structure of claim 19, wherein the inner surface of the lip and the outer surface of the lip touch to form at least a portion of a compression edge where the continuous tack-off is disposed between the lip and the panel.

* * * * *